3,834,975
CONTROL OF CURRENTS IN GLASS DRAWING KILN

Edgar Brichard, Jumet, Belgium, assignor to Glaverbel S.A., Watermael-Boitsford, Belgium
Filed Feb. 24, 1972, Ser. No. 228,963
Claims priority, application Luxembourg, Feb. 24, 1971, 62,648; Great Britain, Jan. 24, 1972, 3,278/72
Int. Cl. C03b 15/04
U.S. Cl. 161—1      52 Claims

ABSTRACT OF THE DISCLOSURE

In a glass drawing kiln containing a mass of molten glass from which a glass ribbon is drawn, the uniformity of the temperature of the glass feeding the ribbon is improved by locally heating the glass in one region of the kiln adjacent, but spaced from, a kiln wall to produce a rising current of heated glass which forms a barrier across which glass adjacent such wall is prevented from flowing and which supplies glass having an increased temperature to the ribbon.

BACKGROUND OF THE INVENTION

This invention relates to improvements in the drawing of sheet glass, such drawing being basically carried out by continuously feeding molten glass into a kiln to establish a continuous forward flow of glass to a drawing zone at which molten glass is continuously upwardly drawn from the surface of the molten glass in the kiln in the form of a ribbon. The invention also relates to apparatus for effecting such improvements and to the novel sheet glass resulting therefrom.

In the performance of a glass drawing process as referred to above, the thermal and flow conditions in the kiln are of critical importance to the quality of the drawn glass. It is in all cases necessary for these conditions to be such that a substantially stable meniscus is established at the surface of the glass at the drawing zone; but the formation and maintenance of such a meniscus by no means ensures that the drawn glass will be of the best quality.

As a drawing operation progresses, glass is drawn inwardly into the meniscus from surface regions of the molten glass surrounding the meniscus and the glass temperature variations which invariably exist between surface regions of the glass at different distances from boundary walls of the kiln, combined with the rather complex flow pattern in the kiln, tend to prevent the formation of a ribbon which is truly flat and of substantially uniform thickness over its width, and also to lead to optical defects due to the mixing in the ribbon of currents composed of glass of different viscosities. These tendencies become more marked as the drawing speed increases.

The problems referred to arise in all drawing processes in which the glass in drawn from the surface of the molten glass in the kiln, as distinct from processes in which the molten glass is extruded into the ribbon from beneath the surface of the molten glass in the klin as in the classic Fourcault process. In such extrusion processes the flow pattern of the glass is quite different and the problems above referred to do not arise.

Broadly speaking, the drawing processes with which the present invention is concerned can be divided into two categories according to the depth of the kiln at the drawing zone. On the one hand, use can be made of a shallow kiln, or pot, from which glass is drawn from the full depth of molten glass at the drawing zone. This category of process includes the classic Colburn process in which the glass ribbon drawn upwardly from the kiln is bent over a bending roller and is conveyed through a horizontal annealing lehr. On the other hand, use can be made of a deep kiln, or tank, in which the forward current of glass flowing to the drawing zone flows over a return current of colder glass coming from the terminal, or downstream, end region of the kiln. This category of process includes the classic Pittsburgh process in which the glass ribbon is drawn upwardly through a vertical drawing tower.

Numerous modifications of these processes are possible within the broad categories referred to. For example the glass ribbon can in any given type of process be drawn from the kiln at an inclination to the vertical and a ribbon drawn from a deep kiln can be bent over a bending roller instead of being drawn through a vertical drawing tower.

The demands for high quality glass and higher rates of production have stimulated a continuous search by manufacturers for ways of creating better thermal and flow conditions in the drawing plant and numerous proposals to this end have been made in recent years.

Thus it has been proposed to heat bottom and side wall portions of the kiln from the outside to particularly high temperatures in order to reduce flow retardation along the walls. This expedience however does not produce conditions which are favorable to the production of high quality sheet glass. In fact it increases the risk of the drawn glass becoming contaminated by grains of refractory material or containing gas bubbles. The tendency for the refractory material to be corroded or eroded increases with increase of temperature of the refractory material.

SUMMARY OF THE INVENTION

An object of the present invention is to provide for an improvement in the drawing of sheet glass by influencing the basic flow pattern within the body of molten glass.

Another object of the invention is to provide for an increased rate of drawing without the usual increased risk of refractory corrosion and erosion which this has hitherto entailed.

The objects according to the present invention are achieved in a process of manufacturing sheet glass by continuously feeding molten glass into a kiln to establish a continuous forward flow of glass to a drawing zone at which molten glass is continuously drawn upwardly from the surface of the molten glass in the kiln in the form of a ribbon, by the improvement in that in at least one place which in plan view is spaced inwardly from a boundary of the surface of the molten glass in the kiln, the molten glass in the kiln is heated to maintain at that place a thermal barrier formed by an upward flow of molten glass which rises to the molten glass surface from a location in the vicinity of a wall portion of or in the kiln so that molten glass behind the barrier is substantially prevented from flowing beneath such barrier.

The process according to the invention affords the important advantage that in at least one region around the meniscus at the root of the drawn glass ribbon, molten glass which is about to feed into the meniscus is given a lower viscosity and therefore a higher flowability without having to flow against a heated kiln wall near the line defining the molten glass surface, where corrosion and erosion are most likely to occur.

The heated upwardly flowing molten glass rises to the surface of the molten glass against a quantity of molten glass which is excluded by the thermal barrier from access to the drawing zone. That excluded quantity of molten glass is continuously kept in movement due to a rather complex system of convection currents which exists on its side of the thermal barrier. Such currents help to avoid or reduce stagnation of any part of the molten glass such as is liable to produce devitrified grains of glass which might possibly become entrained towards the drawing zone.

It is a further important advantage of the process that molten glass which flows downwardly along a side or end wall of the kiln, behind the thermal barrier, and becomes cooler during such downward flow, is prevented from flowing beneath the thermal barrier and directly exerting a cooling action on the molten glass which, in plan aspect of the kiln, is in front of the barrier. Such a cooling action could adversely affect the velocity of flow of molten glass into the ribbon.

The invention makes an important contribution toward achieving a good stratification of the glass in the ribbon so that glass of high quality can be drawn at faster rates.

The "stratification" of a drawn glass sheet identifies its internal structure which is constituted by a series of discernible thin strata of glass due probably to the fact that the glass entering the ribbon cools at different rates throughout the thickness of the ribbon, the rate being highest at the surfaces and lowest at the central plane of the ribbon. These strata are generally, but far from exactly, parallel to the major faces of the ribbon. An ideal stratification is one in which the strata are perfectly flat and perfectly parallel to the major glass faces because this will result in glass having the best optical quality and particularly the smallest degree of optical distortion. Stratification is therefore improved when made to conform more clearly to the ideal.

The extent to which stratification is improved depends in part on the place or places at which a thermal barrier as referred to is created and on the horizontal extent of such barrier or barriers.

In certain embodiments of the invention, involving processes in which molten glass at the surface of the forward current feeds directly into the bottom of the ribbon at its front side and molten glass at a lower level of such forward flow rises at a location behind the drawing zone and forms an oppositely directed surface flow which feeds into the ribbon at its rear side, a thermal barrier is created at a position coinciding with the position where molten glass rises behind the drawing zone. A thermal barrier at that location has a particularly marked beneficial effect.

Over the important main part of the ribbon width, excluding its margins, the glass forming the rear side of the ribbon is wholly or mainly derived from the above-described oppositely directed surface flow. If the glass of that oppositely directed surface flow is significantly less fluid, or more viscous, than the glass of the forward current surface flow, the drawing speed must be kept low if the drawn glass is to be of an acceptable quality. If the drawing speed is raised beyond a certain value, which depends to an appreciable degree on the flow resistance of the glass feeding the rear side of the ribbon, the ribbon will become deformed or will result in sheet glass which is optically very defective.

A drawing speed substantially higher than would normally be permissible can however be established if a thermal barrier in accordance with the invention is formed along a zone extending transversely of the kiln at a position such that some of the heated glass flowing upwardly at that zone serves to form the oppositely directed surface flow of glass into the rear side of the meniscus.

In such embodiments, the thermal barrier may be spaced from the rear end wall of the kiln, but this is not essential because, as hereafter exemplified, a part of that wall located beneath the glass surface can be shaped so as to extend inwardly towards or up to a position beneath the drawing zone so that the thermal barrier can be located over a submerged part of that rear end wall.

Depending on the extent of such thermal barrier across the width of the kiln, it may be possible for currents of glass to move from a location near the central part of the rear end wall of the kiln and to move around the ends of the thermal barrier towards the end portions of the drawing zone from which the margins of the ribbon are drawn. However any impurities thus drawn inwardly to the drawing zone are therefore directed to such end portions of the drawing zone and do not contaminate the central portion of the drawing zone from which the main usable portion of the ribbon is drawn.

Preferably such a thermal barrier which is located rearwardly of the drawing zone extends across the full width of the kiln, or at least over a portion of the kiln width which is at least co-extensive with the width of the ribbon. In that case the whole or substantially the whole of the body of molten glass which is adjacent to the rear end wall of the kiln near the molten glass surface and which would normally be pulled inwardly to the drawing zone by the currents caused by the drawing operation, is effectively isolated by the thermal barrier.

A significant improvement in the drawing process can however be achieved by forming a thermal barrier in accordance with the invention at a location which in plan aspect of the kiln is situated adjacent a boundary of the surface of the molten glass in the kiln and at which there is surface flow of molten glass towards an edge or margin of the ribbon. By means of a thermal barrier so placed, the flowability of the molten glass feeding the corresponding edge or margin of the ribbon is improved due to the heating of such glass and due to a reduction in frictional restraint. The flow of glass feeding the edge or margin of the ribbon is shielded from currents of more viscous glass which has been cooled by contact with the side wall of the kiln near the glass surface. In consequence, the width of the marginal portions of the ribbon which have to be discarded when the ribbon is cut is reduced.

In the case that a thermal barrier is located adjacent a side boundary of the glass surface, as above referred to, it is of course preferable for a similar thermal barrier also to be maintained adjacent the other side boundary of such surface so that similar thermal and flow conditions determine the formation of both side edge or marginal portions of the ribbon.

It is of course very advantageous for thermal barriers according to the invention to be maintained adjacent the two side boundaries of the molten glass surface and also rearwardly of the drawing zone. In that case the glass feeding the rear side of the ribbon and its margins can be kept in a highly flowable condition commensurate with that of the main forward surface flow which directly feeds the front side of the ribbon, and the permissible drawing speeds are maximized since they are determined by the fluidity of the forward surface current.

According to certain important embodiments of the invention there is at least one thermal barrier functioning as above referred to and maintained above a threshold completely immersed in the molten glass. The threshold serves positively to localize the ascending currents resulting from the local heating of the glass. The body of glass which is behind the threshold tends to be kept in stable circulatory movement around a horizontal axis, which also helps to avoid or reduce any tendency for an accumulation of devitrified grains to be formed in the body of glass. Moreover the threshold also serves as a mechanical barrier against inward displacement beneath the thermal barrier of any such grains of devitrified material or of any refractory grains with which the body of glass might possibly become contamined.

Inasmuch as the threshold is submerged and is therefore not in contact with the air above the molten glass, the threshold is not as likely to suffer corrosion by the molten glass currents as is the refractory material at the level of the glass surface.

It is advantageous for the upward flow of glass forming a thermal barrier to commence below the level or the top of the threshold, if such is provided, so that the glass rises against the threshold and continues its upward movement above the level of the top of such threshold. The threshold then better serves to stabilize the upward flow of glass.

The side faces of the threshold may be vertical, or inclined to the vertical, or one such face may be vertical and the other inclined. The height and shaping of the threshold influences the direction of the upward flow paths of the glass forming the thermal barrier and thus the flow pattern of the glass currents feeding the ribbon.

Where a threshold is provided, the threshold may be hollow and the heat required for creating the thermal barrier can be generated by heating members disposed in the space within the threshold. The heating means is thus shielded by the threshold from direct contact with the molten glass such as would restrict the choice of heating means. As heating means, use can be made, for example, of gas or oil burners or electrical resistances.

Use can alternatively be made of a threshold constituted by a single solid wall. In that case the heat for creating the thermal barrier may be generated at the bottom of such wall.

There are also advantages, when making use of a submerged threshold, in using heating means incorporated in, or forming part of, the, or a, wall forming the threshold or part of the threshold. For example, such wall may be formed in part of one or more electrically conductive refractory elements through which electric current can be passed to generate heat by the Joule effect. This method aids the creation of a strong thermal action which is localized where it is most effective for preventing flow of glass currents across the top of the threshold.

For maintaining the thermal barrier at the location of a threshold, it is also possible to use heating means which is actually in contact with the molten glass adjacent the threshold. The use of heating means in contact with the molten glass but not actually forming part of the threshold is useful for generating heat at a well defined zone or zones while leaving the threshold free from any direct heating function and thus widening the choice of its design specifications. By way of example, use can be made of heating elements disposed on a side face and/or on the top face of the threshold.

Alternatively, or in addition, use can be made of heating elements, e.g. electrical resistance heaters, which are located within the body of molten glass and spaced from the threshold. Such an arrangement is of advantage for reducing any risk of corrosion of the threshold. Where it is required to raise to a certain level the temperature of the glass in a particular region spaced from the threshold, this arrangement enables that heating to be effected with a lower energy consumption than if the heat were to be generated in or immediately on the threshold.

In a system in which the kiln is provided with a threshold, the latter can be upwardly extended by a plate to increase the height of the mechanical barrier preventing inward flow of impurities such as devitrified material or bubbles. Such plate can be made of metal, e.g. molybdenum. It is advantageous for the top of the plate to be disposed as close as possible to the free surface of the molten glass in the kiln.

A thermal barrier at one or more locations as required by the invention can of course be created by generating heat within the kiln, by electrical resistance heaters or other means, regardless of whether or not a threshold is provided at that place or places. However, the provision of a threshold is of particular interest because it helps to stabilize the thermal barrier.

A very advantageous way of creating a thermal barrier is to pass an electric current or currents through the molten glass at the region to be heated, between suitably placed electrodes. This type of heating system produces the required heat directly in the molten glass itself and the glass can be kept at a required high temperature while the electrodes are at a lower temperature level which may be low enough substantially to avoid any risk of corrosion of the electrodes by the molten glass.

Electrodes for use in a heating system using the electrical conductivity of the molten glass can be in the form of plates or rods. It is very advantageous however, to use electrodes formed by pools of molten metal or molten metal salt. Molten metal or molten salt electrodes can be of large surface area, producing the additional benefit of a very low frictional restraint on the flow of molten glass in contact with the electrodes.

One very satisfactory heating system makes use of electrodes one at least of which is disposed above a threshold completely immersed in the molten glass.

Another possible arrangement of electrodes which is very suitable in certain cases is an arrangement of the electrodes on opposite sides of such a threshold. By using electrodes disposed in that manner, a considerable volume of molten glass covering the threshold can be directly heated for a comparatively low energy consumption. It is convenient in such a system to use electrodes with large surface areas in contact with the glass so that a given heating effect can be realized with a low current density, which is desirable for avoiding bubble formation in the glass.

In the case that a metal plate is used to increase the height of the physical barrier formed by the threshold and heating is achieved by an electric current or currents passing through the glass between electrodes disposed on opposite sides of the threshold, the plate will define an equipotential surface in the electric field and its shape may be selected to achieve a required preferential direction of the electric current.

In certain embodiments of the invention the molten glass in the kiln is locally heated to create a thermal barrier by passing electric current through the molten glass between electrodes one of which is disposed beneath the location at which the ribbon is drawn from the surface of the molten glass in the kiln. In this way a thermal barrier can be maintained very close to the drawing zone. In one very satisfactory arrangement, a draw bar is provided beneath the drawing location and an electrode in the form of a quantity of molten metal or molten metal salt is held in this draw bar. The presence of a pool of molten metal or molten metal salt at that location is beneficial from the point of view of the low frictional restraint which it imposes on the molten glass flowing into the meniscus.

Another process feature which is of value involves the production of a surface current of molten glass over the thermal barrier and in a direction away from the drawing zone, and the withdrawal of surplus glass from a region behind such barrier. The outward surface current supplements the action of the thermal barrier in countering any tendency for impurities to be entrained inwardly towards the drawing zone. Such an outward surface current can be produced by withdrawing glass via at least one skim hole in a boundary wall of the kiln at a region behind the or a thermal barrier.

The invention includes apparatus for use in drawing sheet glass, the apparatus including a kiln having a feed end at which the kiln can be continuously fed with molten glass, and means for continuously drawing a ribbon of glass upwardly from the surface of the glass at a drawing zone in the kiln, in which there is means for locally heating the molten glass in the kiln in at least one place which in plan aspect of the kiln is spaced inwardly from a boundary of the molten glass surface in order to maintain at that place a thermal barrier formed by an upward flow of molten glass which rises to the surface from a position in the vicinity of a wall portion of or in the kiln whereby the wall portion serves to prevent molten glass behind said barrier from flowing beneath it.

The provision of local heating means according to the invention permits the creation of a hot zone which renders the glass feeding the ribbon from at least one region around the meniscus more fluid, while forming a thermal barrier preventing cooler glass from flowing into the ribbon from the wall portion of the kiln behind the thermal barrier. Consequently glass having good stratification and which is generally of high quality can be drawn at a faster rate by apparatus according to the invention.

In preferred apparatus according to the invention, the drawing zone is spaced from that boundary of the surface of the molten glass in the kiln which is opposite the feed end of the kiln and local heating means which is provided for maintaining an upward flow of glass at a location which in plan aspect of the kiln is between the drawing zone and that opposite boundary reached by the surface of the molten glass in the kiln when the apparatus is in use. The advantage of this and other optional apparatus features hereinafter referred to will be appreciated from the statements which have been made hereinbefore as to the advantages of the corresponding process features.

In the most important embodiments of the invention, means are provided for maintaining the upward flow of glass between the drawing zone and the opposite glass surface boundary, such upward flow occurring across the full width of the kiln or at least over a portion of the kiln width which is substantially co-extensive with the width of the ribbon, this width being determined by the position of the conventional edge rollers between which the margins of the drawn ribbon are drawn.

Advantageously however, apparatus according to the invention can include means for maintaining the upward flow of molten glass in at least one place which in plan aspect of the kiln is adjacent a side boundary to which the surface of the molten glass in the kiln extends when the apparatus is in use. It is particularly beneficial for the apparatus to incorporate means for maintaining such an upward flow of glass adjacent each side boundary of the molten glass surface and in certain apparatus according to the invention, in addition to the heating means for creating the upward flow at those places, means as above referred to are provided for creating a hot zone directly rearwardly of the drawing zone. In that case the flow of molten glass into the rear side of the ribbon and into its edges or margins can be promoted to enable very high drawing rates to be achieved.

Apparatus according to the invention may alternatively including a shallow pot, the drawing means being adapted to draw glass from the full depth of the molten glass in the kiln. In this case, the means for creating a local hot zone in accordance with the invention can be arranged so that it is effective for maintaining an upward flow of molten glass at that zone throughout the full depth of the molten glass in the kiln.

Apparatus according ot the invention may alternatively be of a type including a deep tank, the drawing means being adapted to draw glass from an upper portion of the molten glass in the kiln. In this case the means for creating a local hot zone in accordance with the invention is arranged so that it is effective for maintaining an upward flow of molten glass at that zone, at least in the upper portion of the depth of molten glass in the kiln, and the apparatus is arranged so that the upward flow of molten glass at the hot zone takes place from a location in the vicinity of at least one wall portion so that flow of molten glass beneath the thermal barrier is substantially prevented.

Certain forms of apparatus according to the invention incorporate a threshold located so as to be completely immersed in the molten glass in the kiln when the apparatus is in use, and so that heating means maintains an upward flow of molten glass above such threshold. Preferably heating means are provided for maintaining an upward flow of molten glass from a location below the level of the top of the threshold so that the upward flow occurs against the threshold and continues above its topmost level.

Advantageously the portion of the bottom of the kiln disposed behind a threshold is higher than the portion in front of the threshold. In that case the depth of unused glass behind the threshold is reduced. In the case of a deep kiln process there is the further advantage that the molten glass at the lower levels of the kiln in front of the threshold can be more effectively cooled, which promotes a more positive downward movement of the glass forming the submerged return current.

Advantageously, the apparatus includes a threshold which is hollow and means are provided for generating within the threshold the heat required for creating the local hot zone at that spot.

In other advantageous embodiments, the threshold is constituted by a single solid wall and the means for creating the local hot zone at that spot is arranged to generate heat at the bottom of such wall.

For creating a local hot zone, certain apparatus according to the invention is provided with heating means which is incorporated in or forms part of a wall forming at least part of the threshold. By way of example, such wall may be formed in part by one or more electrically conductive refractory elements, such as one or more tin oxide bricks, through which electrical heating current can be passed. Such heating means can have a surface which is flush with or which is set back or projects from an adjacent part of the threshold surface.

Preferably, the apparatus incorporates heating means for maintaining a local hot zone and a threshold at that zone, such heating means being located within the kiln so as actually to be in contact with the molten glass, adjacent or spaced from such threshold. By way of example, heating elements may be located above the threshold so that the heating of the glass in that region can be more intense or the temperature gradient at that region can be different from that which would be possible if the heating elements were located below or in the threshold. Of course, heating elements can also be provided at a lower level for giving the glass adjacent the threshold an upward impulse.

According to a very satisfactory arrangement, local heating means are provided for heating molten glass in the kiln to maintain the upward flow of molten glass, which heating means generates heat directly within the kiln.

In the most preferred embodiments of apparatus according to the invention, the heating means for maintaining the thermal barrier is composed of electrodes between which electric current can be passed through molten glass in the kiln. Such electrodes may be in the form of plates or rods but preferably they are formed by pools of molten metal or molten metal salt. In one arrangement, there is at least one electrode disposed above a threshold, but preferably the heating means includes electrodes located on opposite sides of the threshold.

It is advantageous to place an electrode beneath the location at which the glass ribbon is drawn from the surface of the molten glass in the kiln when the apparatus is in use. By way of example, a draw bar may be provided at that location and may incorporate or hold an electrode. An electrode located beneath the drawing location as aforesaid can in any case be incorporated in or held by an element which is integral with or connected to the rear end wall of the kiln. In some cases the absence of a free path behind such electrode, along which molten glass can flow upwardly into the path of the electric heating current from a lower level in the kiln, is beneficial in promoting better thermal and dynamic flow conditions within the kiln.

The use of electrodes for heating the molten glass avoids the necessity for transmitting heat energy through refractories with the consequent risk of their being heated to such an extent as to render likely the corrosion of the refractories by the molten glass. Moreover there is less risk of inducing turbulent, uncontrollable convection currents in the glass than when using heating means which relies entirely on convection currents in the glass for heating the glass in the hot zone.

The use of electrodes disposed on opposite sides of the threshold enables a large volume of glass to be heated at the hot zone, giving rise to a very marked upward current. Electrodes with large surface areas can be conveniently located in those areas, which is desirable for avoiding high current densities and the formation of bubbles. It is advantageous for the top of the threshold to be fairly close to the surface level of the molten glass so as to give a relatively high current density over the threshold and to make the threshold as effective as possible as a barrier against the inward movement of impurities into the drawing zone.

When using electrodes on opposite sides of the threshold and at the bottom of the kiln, it is advantageous for the bottom of the kiln to be at a higher level behind the threshold than in front of the threshold because in that case, in addition to the advantages attributable to such a difference in level as hereinbefore referred to, there is the advantage that the electrodes can be closer together.

In the case where electrodes are used, at least one electrode may be made of a solid metal or of an electrically conductive refractory material, preference being given to the refractory precious metals, molybdenum, tungsten and $SnO_2$, doping agents being incorporated if required. It has been found that these materials behave satisfactorily in molten glass at elevated temperature even when an electric current passes through the surface of the material in contact with the glass. Moreover, the solid electrodes can be of a shape selected so as to achieve a predetermined current density distribution.

Special advantages attach to the use of electrodes composed of molten metal or molten metal salt. If the molten metal or salt is heavier than the molten glass, the electrodes are disposed beneath the molten glass and assist in reducing the frictional flow resistance experienced by the molten glass in the kiln. It is possible to use electrodes composed of molten metal or molten metal salt of lower specific gravity than the molten glass. Such electrodes do not in any way impede the molten glass surface currents. Such electrodes can be readily replenished in course of time and their thicknesses can be altered when required. Moreover, their electrical properties can be modified, by changing their chemical compositions, without interrupting the sheet glass production.

Suitable molten metals which are heavier than glass are tin and lead. These metals have a high electrical conductivity.

According to one optional but very advantageous feature of the invention a reservoir is provided for holding an electrode composed of molten metal or metal salt in contact with the molten glass in the kiln, and such reservoir has an extension leading to a cooler region where metal or metal salt occupying such extension can be connected to a conductor cable. This solves most of the problems involved in maintaining a good electrical connection between a cable and an electrode in a very high temperature region, e.g. at the drawing zone side of a threshold. By way of example, a molten tin electrode may be held in a reservoir with an extention channel leading to a cooler zone so that the tin in this channel is in a solid or at least a cooler state, and the cable may be connected to the solid or cooler tin. A molten metal salt electrode may likewise make contact with a body of the same or another metal salt in solid or at any rate cooler, condition, provided that the cooler salt is sufficiently electrically conductive.

The kiln of an apparatus according to the invention may be provided with at least one skim opening located in a boundary wall thereof opposite the location of a means for creating a local hot zone. When the apparatus is in use, a small amount of glass can be withdrawn continuously or intermittently from the surface of the molten glass via such skim opening. The withdrawal of glass from the surface in that way induces an outward current through the top of the thermal barrier to serve as an additional check against the inward flow of impurities.

The present invention further relates to sheet glass produced as described above and itself possessing novel characteristics.

Sheet glass is composed of seams or strata of glass having different refractive indices. The optical quality of the sheet glass depends to a large extent on the relative distribution of the differently refractive seams within the sheet. If there is an appreciable interpenetration of seams of different refractive indices, the sheet tends to give a distorted appearance to objects viewed through the glass under various conditions, even if the main faces of the sheet are optically flat and parallel. The seam pattern depends at least in part on the spatial distribution of the currents of glass of different viscosities feeding the ribbon during the drawing process. The seam pattern existing in any given sample of drawn glass can be seen in an enlarged photographic image of a cross section of the sample cut normal to the line or draw.

Thus, a further object of the present invention is a sheet glass composed of seams of glass of different refractive indices distributed in a way such that light rays entering the sheet glass through either of its faces, over a wide range of angles of incidence, are subject to very little if any refraction within the sheet.

Sheet glass according to the invention is characterized in that the distribution of seams of glass of different refractive indices in a cross section which extends over the full width of the drawn ribbon and which is normal to the line of draw is discernible in any such cross section as a pattern of mainly substantially parallel contour lines forming or visually suggesting a pattern of flat ellipses one within another, and in that this distribution is such that there is no abrupt substantial change of refractive index from one seam of glass to another such as to cause a marked break in the continuity of the parallel interference fringes when the sheet is examined by means of an interferential microrefractometer using a light beam which is projected through the sheet glass parallel with its main faces.

Sheet glass according to the invention has been found to have excellent optical characteristics. The sheet glass gives rise to very little if any apparent distortion of objects viewed through the glass even at shallow or changing angles relative to the plane of the sheet.

When sheet glass according to the invention is examined in cross section normal to the line of draw to detect the pattern of contour lines formed by the juxtaposition of seams of glass of different refractive indices, the contour pattern is seen to be substantially free of crossing lines. The contour lines are mainly substantially parallel and may substantially all describe figures approximating flat ellipses, but this is not essential. However, in all cases the system of contour lines as a whole at least suggests to the eye a basic pattern of flat ellipses due to the fact that there are numerous contours which form flat ellipses or which at least form major parts of flat ellipses.

Techniques for examining and photographically recording the pattern of distribution of differently refractive seams of glass within a drawn glass sheet are well known in glass technology and have been used extensively in relation to samples of sheet glass hitherto available and drawn by various processes. In general the known sheet glass exhibits under such examination a system of contour lines which cross at one or more locations and/or which do not fall into any kind of elliptical pattern.

The pattern formed by the contour lines in sheet glass according to the invention is not however the only important characteristic of such glass. A further important characteristic is the absence of or substantial change in refractive index from one seam of glass to another across the thickness of the sheet. The refractive index variations through the thickness of the sheet are so small or gradual that they do not cause a marked break in the continuity of the interference fringes when the sheet is examined by means of an interferential microrefractometer.

An interferential microrefractometer is an instrument in which a beam of light is projected through a sample to be examined, and is divided into unequally retarded parts to give rise to a pattern of interference fringes. When a sample of sheet glass according to the invention is examined by means of such an instrument, the sheet being located so that the light beam enters one edge face of the sample and emerges from the opposite edge face, such opposed edge faces being parallel, no marked faults appear in the interference fringes whatever be the orientation of the sheet about the axis of the light beam.

A very suitable type of interferential microrefractometer is the one developed by Nomarski. The Nomarski interferential method is described, for example, in the publication "Techniques de l'Ingenieur" of the year 1961, Chapter R3422, paragraphs 6.3 to 6.6, particularly paragraph 6.52, under the heading "Objectif interferential a prisme de Wollaston." This paper is published by "Techniques de l'Ingenieur," 21, rue Cassette, Paris VI, France.

The Nomarski instrument incorporates a slit light source and a combination of prisms and polarizing filters to create an interference pattern in the form of a series of parallel lines or bands. When using such an apparatus for testing a sheet of glass the sheet should be located in a plane which is non-parallel to the interference lines or bands. The sheet can for example be located in a plane which is at 45° to such lines or bands. A sheet of glass according to the invention does not however give rise to a marked break in the interference lines or bands whatever be the orientation of the sheet about the axis of the light beam so that the sheet can be rotated about such axis during the test and no marked faulting of the interference lines or bands will appear during rotation of the sheet through 360°.

Sheet glass according to the invention as above defined can be produced by the drawing process according to the invention. By means of such a process, sheet glass according to the invention can be produced with consistent reliability, particularly when a thermal barrier is created directly rearwardly of the drawing zone. It is supposed that one result of establishing and maintaining a thermal barrier or two or more thermal barriers as hereinbefore described is that the flow profile existing in the mass of molten glass in the kiln at a position in front of the drawing zone is substantially maintained over the part of the kiln in which the glass currents change direction to feed into the front and rear sides of the ribbon.

Preferred embodiments of sheet glass according to the invention are characterized by the substantial absence of brush lines.

One feature of much of the known sheet glass is the presence on at least one face of the sheet glass of defects known as "brush lines." Such defects can be observed and recorded by interferometry, using the known Fizeau fringes, or by examining a reflected image of the glass face, obtained by causing a light beam to be reflected from the face onto a light-diffusing screen as will hereafter be more particularly described.

Sheet glass according to the invention which is further characterized by the substantial absence of brush lines can be produced consistently and reliably by a process according to the invention as hereinbefore defined if a thermal barrier is maintained at a location which is directly rearward of the drawing zone. The effect of such a thermal barrier is to protect the current of glass which rises and feeds into the rear side of the glass ribbon from contact with the rear end wall of the kiln and it is presumably this fact which entirely or mainly accounts for the substantial absence of brush lines from the drawn sheet glass.

BRIEF DESCRIPTION OF THE DRAWINGS

FIG. 6 is an elevational longitudinal cross section of part of another Pittsburgh-type machine having an embodiment of the invention.

FIG. 23 is a photographic reproduction of the interference fringes formed by light rays projected through a sample of sheet glass represented by FIG. 22 and drawn by a classic Pittsburgh-type drawing process, during testing of such sample in an interferential microrefractometer according to the "Nomarski" method hereinbefore referred to.

DESCRIPTION OF THE PREFERRED EMBODIMENTS

Figure 1:
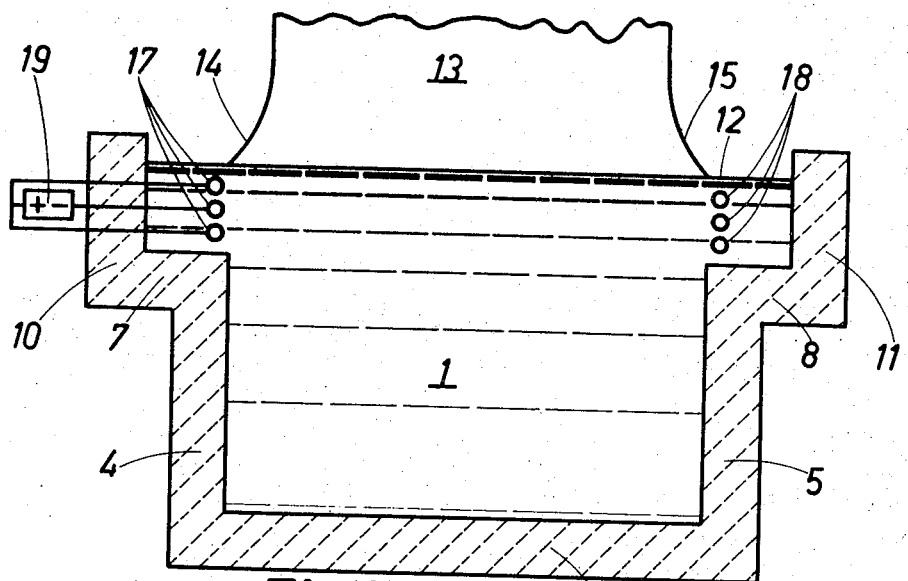
FIG. 1 is an elevational transverse cross section of part of a Pittsburgh-type machine, taken on line I—I of FIG. 2, provided with an embodiment of apparatus according to the invention.
Figure 2:
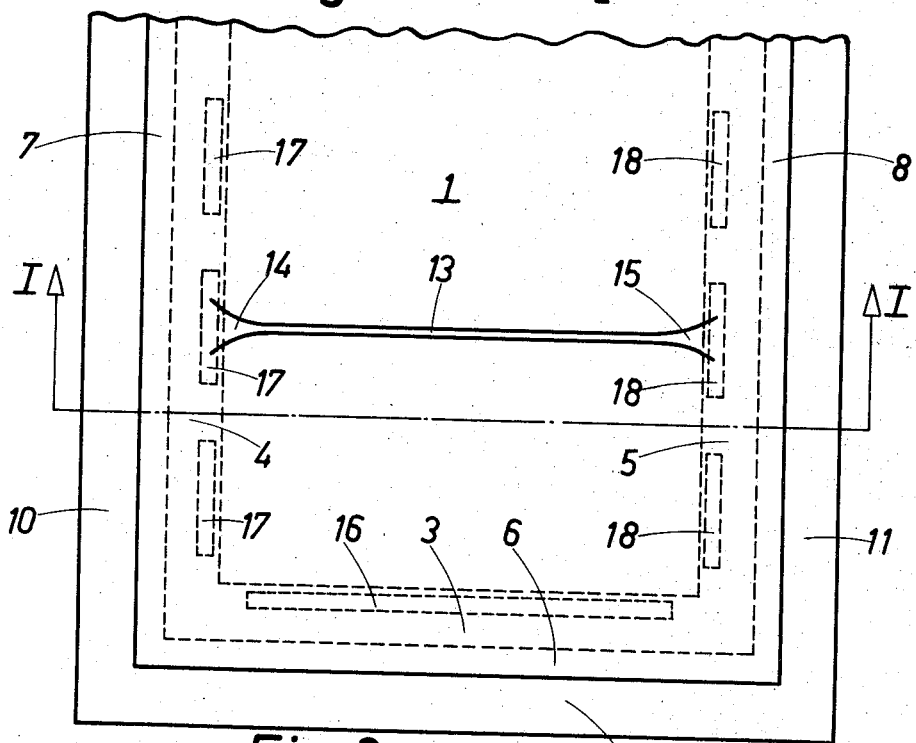
FIG. 2 is a plan view of the machine portion shown in FIG. 1.

The machine shown in FIGS. 1 and 2 includes a kiln constituted by a deep tank 1 for holding a quantity of molten glass. The lower portion of the tank is defined by a sole 2, a lower rear end wall portion 3 and lower side wall portions 4 and 5. At its upper portion, the horizontal dimensions of the tank are extended by horizontal wall portions 6, 7 and 8 which extend outwardly from the walls 3, 4 and 5, respectively, and support an upper end wall 9 and upper side walls 10 and 11.

When the apparatus is in use, molten glass is continuously fed into the tank via its end (not shown) remote from the end wall 3, 9 so as to maintain the surface 12 of the molten glass at the indicated level within the tank while glass is drawn upwardly from such surface in the form of a continuous ribbon 13 having lateral, or side, edges 14 and 15. The line of intersection of the glass surface 12 with the tank walls is referred to as the "flux line."

Within the tank there are three horizontally extending electrodes 16 disposed one over the other parallel to, but inwardly spaced from, the upper end wall portion 9 of the tank. Three similar groups each of three horizontally extending electrodes 17 are disposed parallel to, but inwardly spaced from, the upper side wall portion 10 and three similar groups each of three horizontally extending electrodes 18 are disposed parallel to, but inwardly spaced from, the upper side wall portion 11 of the tank. The electrodes 17 are connected to a source 19 of direct electric current, the central electrode 17 being connected to one pole of such source and the top and bottom electrodes 17 being connected to the other pole thereof. The other group of electrodes, i.e. the electrodes 16 and 18, are similarly connected to electric current sources which, however, are not shown to avoid complicating the drawings.

The drawing machine incorporates, over the tank, a drawing chamber and tower section through which the ribbon of glass is drawn by rollers. These and other parts of the machine are in accordance with well known practice and need no explanation or illustration.

The electrical potential applied to the electrodes of each of the groups 16, 17 and 18 is such that a continuous electric current passes through the molten glass in the kiln between the electrodes at different potentials in that group. The voltage is such that at no place is the current density in the molten glass in excess of 0.4 amps/cm.$^2$, and by virtue of the passage of the electric current through the molten glass the temperature of the glass in the vicinity of each group of electrodes is about 40° C. higher than it would otherwise be. In consequence a thermal barrier is established and maintained at the site of each group of electrodes.

At this site there is a continuous upward flow of molten glass which rises from a location in the vicinity of the underlying horizontal wall portion 6, 7 or 8, as the case may be. Some of the upwardly flowing molten glass flows inwardly along the surface of the molten glass in the tank toward the meniscus at the bottom of the ribbon 13, and the remainder of such upwardly flowing molten glass flows outwardly toward the adjacent wall portion 9, 10 or 11, as the case may be.

Behind each thermal barrier, i.e. between the barrier and the adjacent upper wall, there is a relatively cool zone of molten glass and the shaping of the side and end walls of the kiln to provide the horizontal wall portions 6, 7 and 8 underlying the thermal barriers prevents glass from such relatively cool zones from flowing inwardly beneath the barriers. In consequence there is appreciably less risk that devitrified glass grains which may form adjacent the wall portions 6, 7, 8, 9, 10 and 11, and that grains of corroded refractory material which may separate from the flux line blocks of the wall portions 9, 10 and 11, will pass inwardly into the currents of glass feeding the meniscus at the bottom of the glass ribbon 13.

The quantities of glass in the relatively cool zones behind the electrode groups are circulated about horizontal axes and this in turn reduces the risk of devitrification and bubble formation occurring in the molten glass at lower levels of such zones. Moreover, the local heating of the glass at the sites of the electrode groups reduces the viscosity of the glass flowing into the rear side and the side edge margins of the ribbon so that the width of the marginal portions of the ribbon which exceed the maximum permissible thickness is reduced for any given speed of drawing and glass of a given quality standard can be drawn at a faster rate than in conventional processes. The increase in the usable width of the drawn ribbon when using a process according to the invention can be for example as much as 10 cm. when the above-mentioned 40° C. temperature increase is achieved.

In a modification of the process described with reference to FIGS. 1 and 2, only the electrodes 16 were used. In that case the maximum drawing speed was somewhat less due to the restraint imposed by the somewhat higher viscosity of the molten glass feeding the marginal edge portions of the glass ribbon and the width of the marginal edge portions of the ribbon which had to be discarded as waste was greater due to contamination of the glass in those regions by devitrified grains. The quality of the sheet glass at the operative drawing speed was however considerably better than during an identical operation of the plant, but without using the electrodes 16, and of course without using electrodes 17 and 18.

According to another modification, only the electrode groups 17 and 18 were used. In that case the maximum drawing speed at which a ribbon having a given standard of flatness and uniformity of thickness could be drawn was higher than in a conventional process without a thermal barrier, the width of the marginal portions which exceeded the maximum permissible thickness being normal. However it was found that there were appreciably more defects in the central part of the drawn ribbon, due to the presence of devitrified grains and bubbles, than when the electrodes 16 were used.

Figure 3:
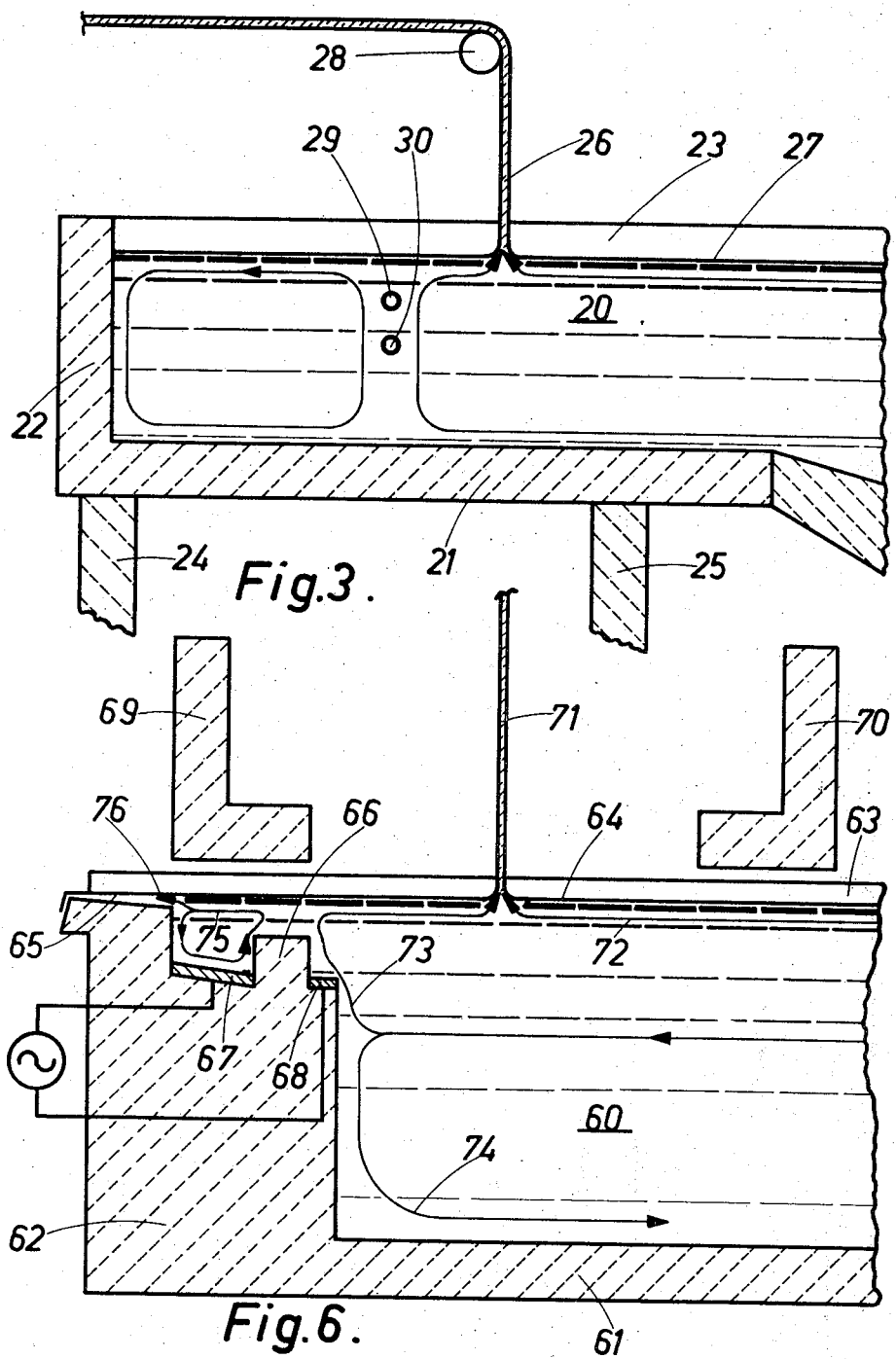
FIG. 3 is an elevational longitudinal cross section of part of a Colburn-type machine provided with an embodiment of apparatus according to the invention.

Reference is now made to FIG. 3 illustrating part of a standard Colburn-type glass-drawing machine equipped for performing a process according to the invention. The machine includes a shallow drawing kiln, or pot, 20 defined by a sole 21, a rear end wall 22 and side walls only one of which, wall 23, is visible in the drawing. The pot is supported by piers 24 and 25. Molten glass is fed continuously into and along the pot from a glass melting furnace towards the rear end wall of the pot and a ribbon of glass 26 is drawn continuously from the surface 27 of the glass in the pot and passes around a bending roller 28 into an annealing lehr. The annealing lehr, the rollers employed for conveying the glass ribbon through the lehr, the lip tiles and other standard parts of the machine are not illustrated and need no explanation as they are in accordance with standard practice.

The pot 20 is shallow so that the glass entering the continuously drawn ribbon 26 is drawn from the full depth of the molten glass in the pot.

Within the pot 20, at a location between the drawing zone and the rear end wall 22, there are two electrical resistance heaters 29 and 30 extending transversely across the full width of the pot, parallel to both the drawing zone, and the rear end wall.

During the glass drawing process, electric current is passed continuously through the resistance heaters 29 and 30 so as to effect local heating of the molten glass in the corresponding region of the pot. The heaters icnrease the local temperature of the glass by about 50° C. In consequence there is a continuous upward flow of molten glass to the surface 27 in the vicinity of the heaters. Such upward flow of molten glass takes place from the vicinity of the directly underlying portion of the sole 21 of the pot.

The basic flow pattern of the molten glass in the pot, in the vertical longitudinal plane of FIG. 3, is represented by arrows in the drawing. It will be noted that the flow pattern differs from that which takes place in conventional shallow pot processes in that the flow of glass into the rear face of the ribbon does not take place from the rear end wall of the pot but from a location which is spaced inwardly from that wall along the surface of the molten glass, that location being determined by the position of the heaters 29 and 30.

The molten glass situated behind the vertical transverse plane containing the heaters is substantially excluded from the flow of glass to the meniscus by the thermal barrier constituted by the ascending current of glass around the heater. Flow of molten glass beneath the thermal barrier cannot take place to any notable extent because the upward flow of molten glass commences from the bottom of the kiln.

The molten glass behind the thermal barrier is kept in movement by continuous circulatory convection currents. Any grains of devitrified glass which may form in the vicinity of the rear end wall or and/or any grains of corroded refractory material which may separate from the refractory wall in that region are virtually excluded from access to the drawing zone by such thermal barrier. By virtue of this fact and the low viscosity of the glass feeding the rear face of the ribbon, the maximum drawing speed at which good quality sheet glass can be drawn is increased by about 30% without any attendant reduction in glass quality.

Figure 4:
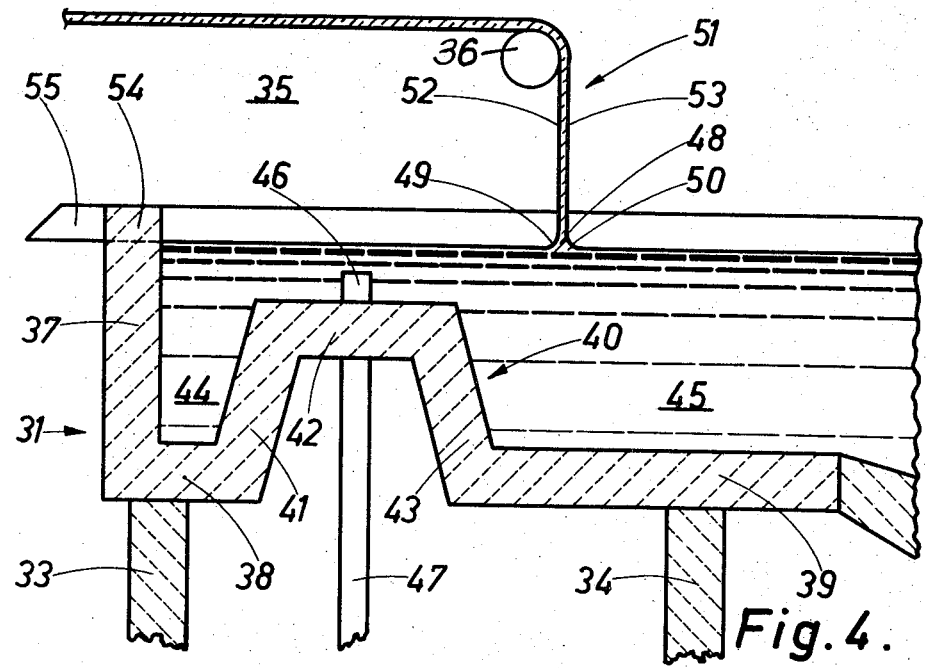
FIG. 4 is an elevational longitudinal cross section of part of another Colburn-type machine, taken on line IV—IV of FIG. 5, having another embodiment of the invention.
Figure 5:
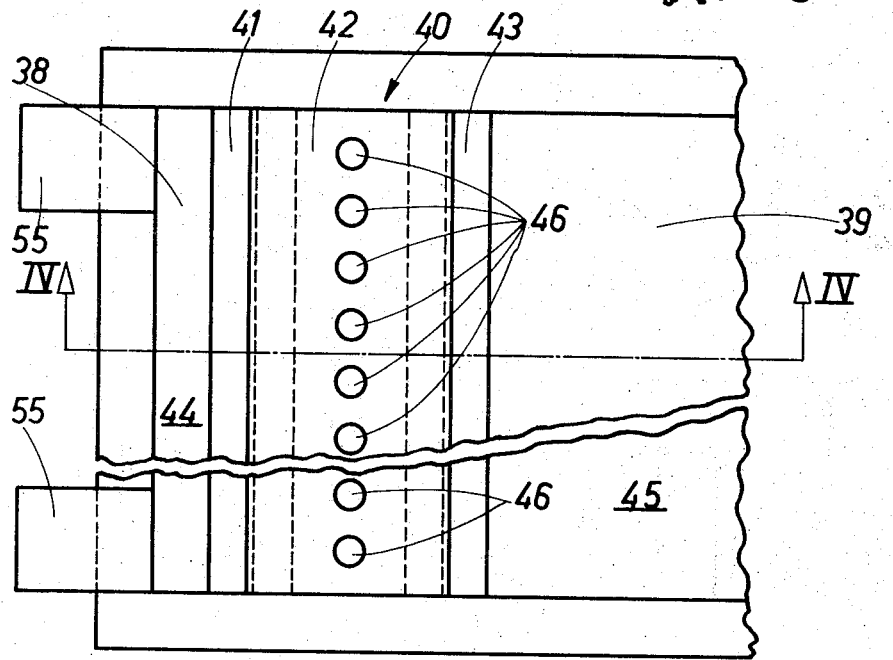
FIG. 5 is a broken plan view of the machine part shown in FIG. 4.

Reference is now made to FIGS. 4 and 5 where again only such parts of the machine are illustrated as are required for describing and understanding the invention. FIGS. 4 and 5 show part of a pot 31 into which the molten glass is continuously fed from a glass melting furnace, this pot being supported on piers 33 and 34. The region 35 above the pot is in practice enclosed, this being the region within the conventional drawing chamber, but the drawing chamber with its lip tiles, the annealing lehr, the conveying rollers by which the glass ribbon is supported and conveyed through the lehr, and other parts which are standard in this type of machine, have not been shown as they are not relevant to an understanding of the invention. The only part located above the pot which is illustrated in the drawing is the bending roller 36 around which the glass ribbon passes before entering the annealing lehr.

The pot 31 has a rear end wall 37 and a sole composed of sections 38 and 39 adjacent, and at respective sides of, a threshold 40 which extends transversely across the pot and is formed by walls 41, 42 and 43. The threshold divides the lower portion of the pot into an end compartment 44 and a front compartment 45.

A series of electrical resistance heaters 46 extend upwardly through the threshold so as to penetrate into the molten glass in the pot and are connected to a source of electric current (not shown). The lower portions 47 of these electrodes, located outside the pot, are sheathed with refractory material.

Glass is drawn upwardly from the surface of the molten glass in the pot so that a meniscus 48, the rear and front faces of which are designated 49 and 50, is established at the molten glass surface, leading into the glass ribbon 51 having rear and front faces 52 and 53, respectively. It is to be understood that as used herein, "rear" is the downstream side with respect to the direction of flow of molten glass from the melting tank and "front" is the upstream side.

In an actual embodiment of a process using apparatus as illustrated by FIGS. 4 and 5, the electrodes 46, which were located at intervals of 25 cm. across the pot, were connected to a voltage source such that the total power output acting to heat the molten glass above the threshold 40 was 30 kw. This power output maintained the glass in the region above the threshold at a temperature 30° C. above what it would otherwise be.

It was observed that this local heating of the molten glass produced a stable upward flow of molten glass along the walls 41 and 43 of the threshold and continuing up to the surface of the molten glass in the pot. The currents of molten glass ascending along the wall 41 flowed outwardly toward the rear end wall 37 of the pot and descended along this wall so that the quantity of glass occupying the compartment 44 was maintained in circulatory movement and was effectively isolated from the surface flow of glass feeding the rear side 49 of the meniscus 48. This surface flow of glass into the rear side of the meniscus derived wholly, or at least mainly, from the upward flow of molten glass along the front wall 43 of the threshold.

Grains of corroded refractory material or of devitrified glass forming in the compartment 44 were entirely, or almost entirely, excluded from access to the drawing zone, i.e. from the region at the surface of the molten glass in the pot where the meniscus 48 was formed.

This latter result was moreover further promoted by the fact that the rate of feed of molten glass to the pot from the glass melting furnace was slightly (about 1%) in excess of the rate of withdrawal of molten glass from the pot into the ribbon 51. The excess glass was continuously discharged through a series of skim holes 54 formed in the end wall 37 at the level of the molten glass surface and leading into flow channels 55. A similar result could be achieved by forming the holes 54 in the end wall 37 at a lower level. Whatever be the level of the skim holes, the discharge of glass through these holes could be intermittent instead of continuous.

FIG. 6 shows part of a Pittsburgh-type machine which includes a tank 60 having a sole 61, a rear end wall 62 and side walls only one of which, wall 63, is visible in the drawing. Preferably the end wall 62 is formed from a plurality of refractory elements of different compositions in order that the temperature of the mass of molten glass in the tank can be better controlled, but that is not essential. The tank is kept filled with molten glass up to a level 64, just sufficient to maintain a slow continuous discharge of molten glass via an overflow 65 at the top of the end wall 62.

The end wall 62 is specially formed to provide a threshold 66 completely submerged in the molten glass in the tank and extending across the full width of the tank. The top faces of the portions of the wall 62 which are adjacent the threshold 66, and which are likewise submerged in the molten glass, support respective electrodes 67 and 68 preferably formed of tungsten.

The tank 60 is surrounded at the top by the usual drawing chamber which is bounded at the rear and front by rear and front L-blocks 69 and 70, respectively, and through which the molten glass is drawn continuously in the form of a ribbon 71. The drawing chamber is surmounted by a tower section through which the ribbon is drawn upwardly by entraining rollers. These and other parts of the machine, such as the coolers provided within the drawing chamber and the edge rolls between which the edges of the ribbon are gripped a short distance above the surface of the molten glass in the tank are not shown as they are in accordance with well established practice and are not relevant for the purpose of describing the invention.

The electrodes 67 and 68, which extend across the full width of the tank 60, are connected to the poles of an alternating electric current source, diagrammatically represented in the drawing, so that an electric current passes continuously through the molten glass between such electrodes. The electric potential is such that the current density within the glass is nowhere in excess of 0.6 amps/cm$^2$.

The glass ribbon is fed by a forward flow of molten glass constituting the upper part of the molten glass mass in the tank. Molten glass at the surface region of this forward flow feeds directly into the front face of ribbon as indicated by arrow 72, whereas some of the glass at a lower level in such forward flow continues past the drawing zone and then flows upwardly to the surface of the glass in the vicinity of the threshold 66, as indicated by arrow 73, before flowing back to the meniscus along the surface region of the molten glass mass and then into the rear face of the ribbon.

Some of the molten glass flowing forwardly to the region of the rear end wall 62 descends along this wall and forms the submerged return current 74. The glass in the surface flow into the rear side of the meniscus is maintained at a relatively low viscosity due to the continuous local heating of the glass in the vicinity of the threshold 66. In consequence, the stratification of the glass in the ribbon is improved and drawing can proceed at a faster rate than in a conventional process. The increase in the rate of drawing can be as much as 20–30%, or even more.

The quantity of glass behind the threshold 66 is effectively isolated from the flow of molten glass to the meniscus due to the thermal barrier maintained over the threshold by the electric heating current passing through the glass. The threshold itself prevents glass from flowing beneath such thermal barrier. The heating of the glass in the vicinity of the threshold keeps the glass behind the threshold in circulation, as represented by the current line 75, and this helps to reduce the risk of pollution of the glass flow 73 by impurities such as grains of devitrified glass and of corroded refractory material. The threshold itself, being completely submerged in the molten glass, is subject to corrosion only to a very slight extent. The restraint on the inward movement of impurities towards the drawing zone is increased by virtue of the outward surface current created by the withdrawal of a quantity of molten glass, in the form of an overflow current 76, via the overflow 65.

It is to be particularly noted that the spacing of the drawing zone from the rear end wall 62 of the tank is substantially less than in prior art Pittsburgh apparatus. In fact, by adopting the illustrated system, the mass of glass held in the tank rearwardly of the vertical plane containing the meniscus can be reduced by about one half as compared with conventional apparatus of the Pittsburgh type.

Figure 7:
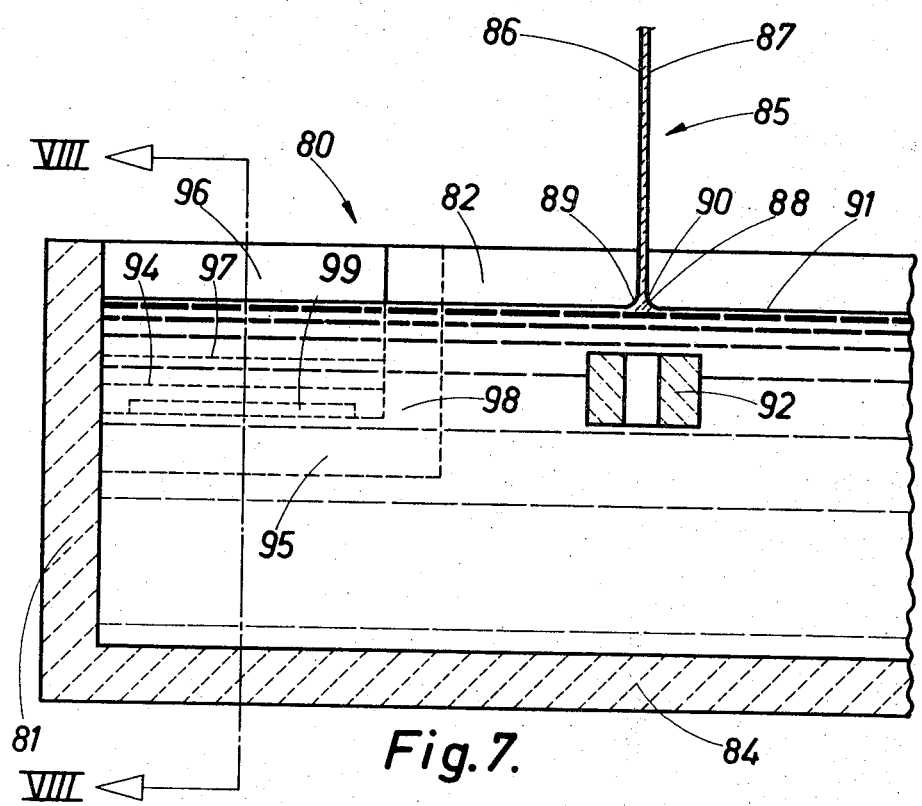
FIG. 7 is an elevational longitudinal cross section of part of another Pittsburgh-type machine equipped with an embodiment of the invention.
Figure 8:
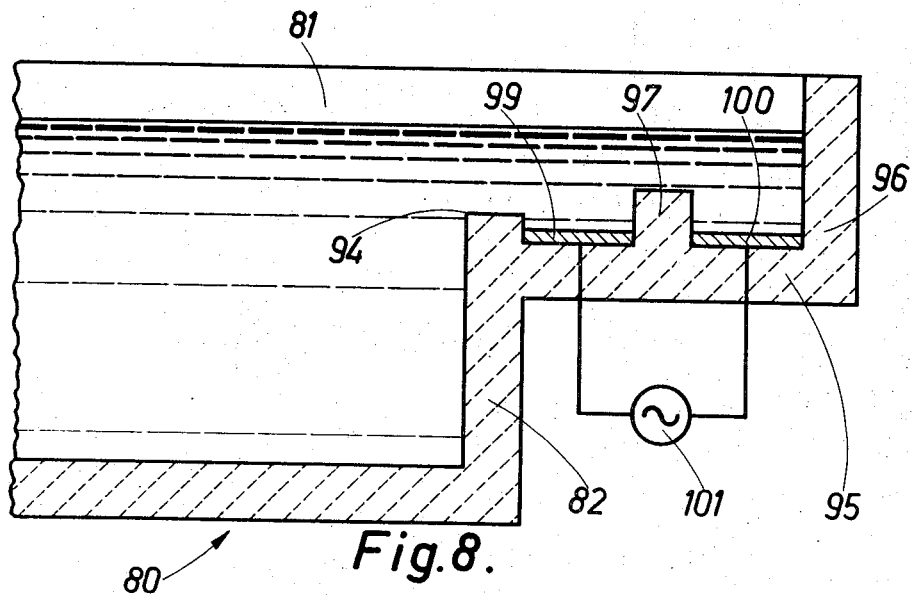
FIG. 8 is an elevational transverse cross-sectional view of part of the machine represented in FIG. 7, taken on the line VIII—VIII of FIG. 7.

Referring to FIGS. 7 and 8, the Pittsburgh-type machine there represented includes a tank 80 having a rear end wall 81, side walls, one of which, wall 82, is visible in the drawings, and a sole 84. A ribbon of glass 85 with rear and front faces 86 and 87, respectively, is drawn from the molten glass in the tank, the molten glass entering the ribbon via a meniscus 88 having rear and front faces 89 and 90, respectively, formed at the surface 91 of the molten glass in the tank. The location of the meniscus 88 is stabilized by a draw bar 92.

The conventional superstructure composed of the drawing chamber and its associated parts and the tower section through which the glass ribbon is drawn have not been shown in the drawings as they are in accordance with conventional design.

The side edge margins of the ribbon 85 are of greater thickness than the main central part of the ribbon width in the same way as for the ribbon shown in plan view in FIG. 2, but the greater thickness of the remote side edge margin behind the plane of FIG. 7 has not been illustrated.

The rear end portion of the tank is locally widened at its upper portion. FIG. 8 shows the form of one side of the tank at this rear end portion. The other side of the tank is of identical form, the local widening of the tank being symmetrical with respect to its central longitudinal vertical plane.

Referring to FIG. 8, at the rear end portion of the tank, the side walls 82 is of reduced height, and terminates at the level 94. At the region of the upper level of this shallower side wall portion there is a horizontal wall portion 95 extending outwardly to the bottom of an upper side wall portion 96. A threshold 97 extends upwardly from the horizontal wall portion 95. This threshold extends over the full longitudinal distance between the rear end wall 81 of the kiln and a wall 98 which forms the front boundary wall of the laterally extended portion of the tank.

The horizontal wall portion 95 supports tungsten plates 99 and 100 located on respectively opposite sides of threshold 97. These tungsten plates are connected to the poles of a source 101 of alternating electric current. When the machine is in use, the source 101 produces an alternating electric current which passes through the molten glass, between the plates 99 and 100, and thus over the threshold 97. A hot zone is thereby maintained in this region, resulting in a continuous upward flow of molten glass along the sides of the threshold and up to the surface of the molten glass in the tank.

As appears in FIG. 7, the electrode plates 99 and 100 do not extend over the full distance between the walls 81 and 98. The plates could of course extend over the full distance if so required. In fact, the dimensions of the plates are chosen in order to attain a required predetermined electric current density through the molten glass. The electric currents through the molten glass located within the lateral extensions of the tank heat the currents of glass flowing from the rear end of the tank into the end portions of the meniscus 88, from which the side edge margins of the glass ribbon are drawn.

In conventional processes the molten glass which flows back to the end regions of the meniscus from the side walls of the tank near its rear end tends to reach an appreciably lower temperature and thus a higher viscosity. This is one of the factors which normally limits the maximum permissible drawing speed. By heating such currents of molten glass by means of a thermal barrier, the drawing speed can be increased and/or there is an increase in the width of the usable portion of the ribbon over which its thickness is below a permissible maximum.

By way of modification of the process described with reference to FIGS. 7 and 8, the metal plate electrodes could be replaced by pools of molten metal, such as molten tin, or by pools of molten metal salt, with the advantage that the frictional restraint on the flow of the molten glass feeding the ends of the meniscus at its rear side is still further reduced.

Under favorable conditions, it is possible, by adopting the form of tank and the thermal barrier system described with references to FIGS. 7 and 8, to attain a drawing speed which is of the order of 1.8 to 2.0 times the maximum drawing speed attainable in conventional prior art processes.

Figure 9:
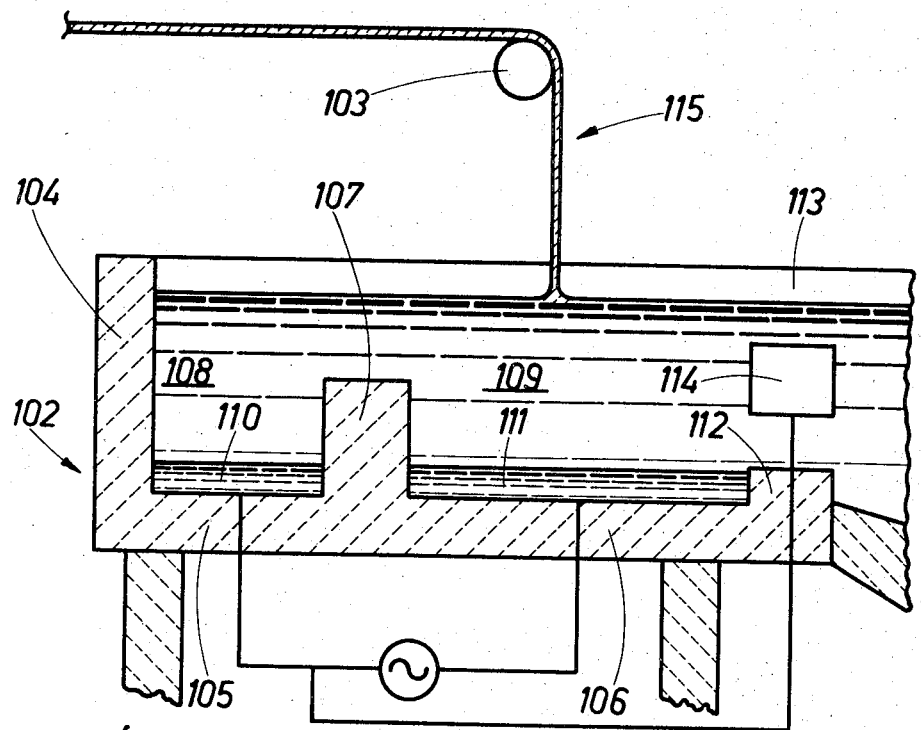
FIG. 9 is an elevational longitudinal cross section of part of another Colburn-type machine.

In FIG. 9 there is illustrated a part of a Colburn-type machine, namely a part of the shallow kiln, or pot, 102 from which molten glass is drawn, and the bending roller 103 over which the drawn ribbon of glass passes preparatory to conveyance through the annealing lehr. The drawing chamber and the annealing lehr and various other parts which are standard in machines of this kind but are not relevant for the purpose of describing the invention have been omitted from the drawing.

The shallow kiln 102 is composed of a rear end wall 104, side walls one of which, wall 113, is visible, and a sole formed of sections 105 and 106 respectively located to the rear and front of a threshold 107 extending transversely across the kiln. The threshold 107 separates the lower portion of the kiln into a rear compartment 108 and a front compartment 109.

The sole sections 105 and 106 are covered by layers 110 and 111 of molten tin which likewise extend over the full internal width of the kiln. The layer 111 is retained at its front boundary by a sill 112. The side wall 113 of the kiln incorporates, in place of one of the normal refractory blocks, a block 114 of tin oxide. The other side wall (not visible) incorporates an identical tin oxide block at a position directly opposite the block 114.

The layers 110 and 111 of molten tin at the bottom of the kiln are connected to respectively opposite poles of a source of electric current, as represented in the drawing. The pole of the electric current source which is connected to the layer 110 is also connected to each of the tin oxide blocks, such as block 114, incorporated in the side walls of the kiln.

In consequence, a flow of electric current is maintained along three paths within the mass of molten glass held in the kiln. One electric current path lies betwen the layers of molten tin 110 and 111 at the bottom of the kiln, and consequently over the threshold 107. A second electric current path lies between the layer 111 of molten tin and the tin oxide block 114. A third electric current path lies between that same layer 111 and the opposite tin oxide block in the other side wall of the kiln.

The electric current paths between the layer 111 and the tin oxide blocks extend through quantities of molten glass immediately adjacent the inner surfaces of the side walls of the kiln. The superficial area of the layers 110 and 111 of molten tin is such that the current density along the first of the paths is at no point in excess of 0.5 amps/cm.$^2$, while the current density along the second and third of such paths is at no point in excess of 0.2 amps/cm.$^2$ At such low current densities these is little risk of bubble formation within the molten glass.

The heating of the glass by the electric current flowing along the first path causes molten glass to flow upwardly along the front and rear faces of the threshold 107 and to continue moving upwardly to the surface of the molten glass. The electric current density along this path is at its greatest in the region above the threshold and the glass is consequenly heated to the greatest extent at that location.

Any impurities, such as grains of devitrified glass or grains of corroded refractory material, which become entrained in the flow of molten glass at the rear side of the threshold 107 do not become caught up in the flow of glass to the drawing zone but are recirculated back in the compartment 108 toward the rear end wall 104. In this compartment the molten glass is maintained in stable counterclockwise rotary movement.

In the compartment 109, the molten glass flowing along the layer 111 of molten tin flows upwardly along the front side of the threshold 107, up to the surface region of the molten glass and back along that surface region into the meniscus via which the glass flows into the ribbon 115.

At the same time, the continuous heating of glass in the zones extending along the side walls of the kiln, between the layer 111 of molten tin and the tin oxide blocks such as 114 in such side walls, stabilizes the currents of glass along such walls while diminishing the frictional retardation of the currents of molten glass along these walls and promoting the free flow of molten glass to the meniscus. Using such a process, a ribbon of glass of substantially constant thickness can be drawn at a speed which is of the order of 1.5 to 1.7, or even more times the maximum drawing speed in conventional prior art processes.

Figure 10:
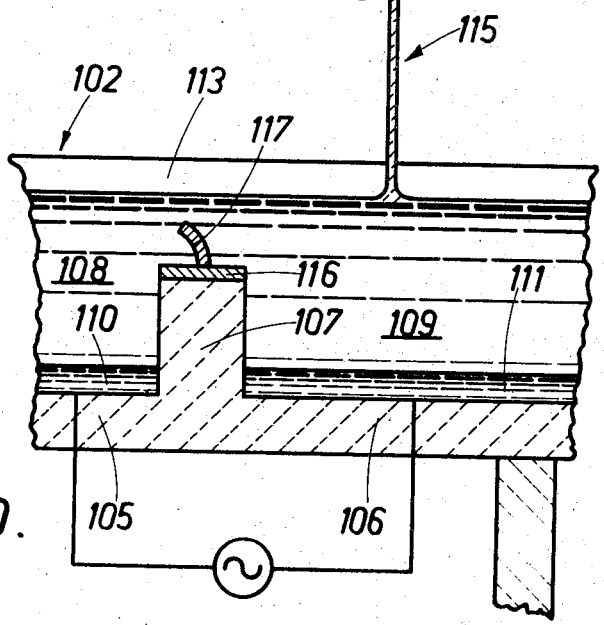
FIG. 10 is an elevational longitudinal cross section of part of another Colburn-type machine.

FIG. 10 illustrates a modification of the machine shown in FIG. 9. The modification resides in the provision of a top extension element on the threshold 107, this extension element including a base portion 116 supporting a curved plate 117 which extends upwardly to a short distance below the surface of the molten glass. This extension element is made of molybdenum and the plate 117 constitutes an equipotential plane in the path of the electric current between the layers 110 and 111 of molten tin. The form and dimensions of this plate influence the configuration of the electric field lines and in consequence the electric current density. Moreover the plate 117 forms a supplementary barrier against the movement of polluted glass currents over the threshold from compartment 108 to compartment 109.

Figure 11:
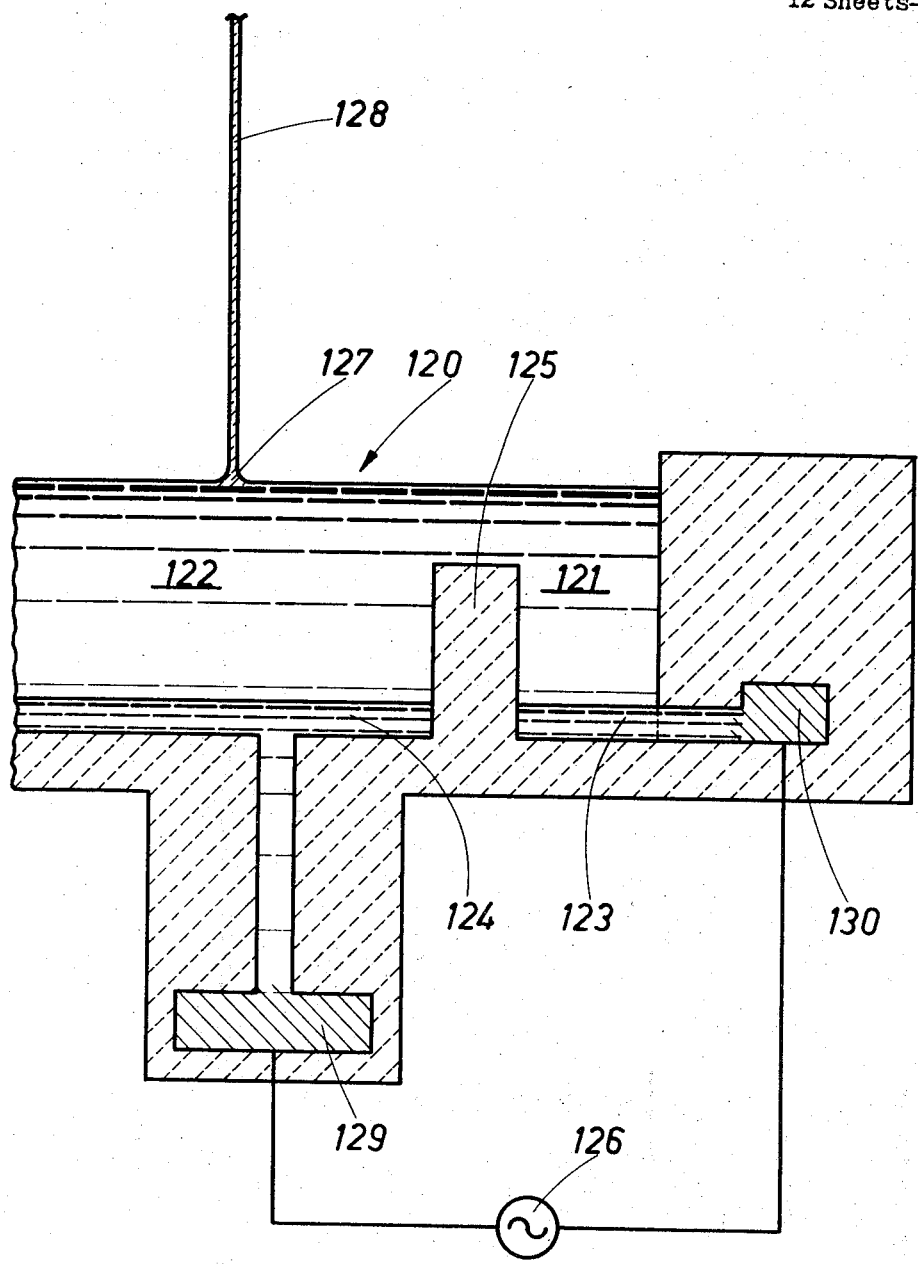
FIG. 11 is a vertical longitudinal cross section of part of another Colburn-type machine.

FIG. 11 shows part of a shallow kiln machine generally of the Colburn type, in which the molten glass 120 in the kiln floats on quantities of molten metal held in the bottom of the kiln. Within the lower part of the kiln there are rear and front compartments 121 and 122, respectively, containing, at the bottom of the kiln, layers of molten tin 123 and 124, the compartments and the different quantities of molten tin being separated by a threshold 125. The quantities of molten tin are respectively connected to the opposite poles of an alternating electric current source 126 so as to create a thermal barrier at the location of the threshold. Molten glass is drawn from the surface of the molten glass in the kiln, through a meniscus 127, into a ribbon 128.

A special feature of the arrangement shown in FIG. 11 consists in the construction of the refractory walls of the kiln so as to define channels and recesses 129 and 130 which are maintained filled with quantities of tin continuous with the molten tin layers 124 and 123, respectively. The quantities of tin 129 and 130 are in their solid form, the dimensions of the recesses in which these quantities of tin are held being such that the current density through the metal within these recesses is not sufficient to melt the metal. By virtue of the solid state of the metal in these regions, the connections to the alternating electric current source can be made very easily, avoiding the well known multiple problems involved in the connection of electric cables to metal electrodes maintained at very high temperatures.

FIGS. 12, 13, 14, 15, 16 and 17 show various forms of thresholds and associated heating means for creating a thermal barrier. Any of the threshold and heating systems shown in these figures can be used in a Pittsburgh-type and in a Colburn-type process and any of these systems can thus be used in any of the machines or processes already described with reference to FIGS. 1 to 11. When adopting a Pittsburgh or any tank, or deep-kiln, type process in which the molten glass is not drawn from the full depth of the molten glass in the tank it is of course necessary for the threshold to reach above the upper level of the submerged return current of glass flowing back along the tank towards its feed end.

The threshold shown in each of FIGS. 12 to 17 is designated 131. The threshold is hollow and composed of a top wall portion 132 and rear and front walls 133 and 134, respectively.

Figure 12:
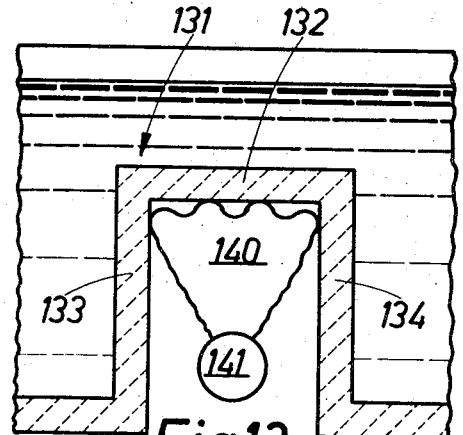
FIGS. 12 to 17 are elevational detail views of portions of the kilns of six different glass-drawing machines in cross section parallel to the longitudinal axes of the kilns.

In the system shown in FIG. 12, the threshold is heated by flames 140 issuing from a gas burner 141 extending along the interior of the threshold, and located so that the flames play against the top wall portion 132 and the upper portions of the rear and front walls 133 and 134. The elongated form of these walls is favorable to an intense and uniform heat exchange between the threshold and the molten glass located at the site of this threshold.

Figure 13:
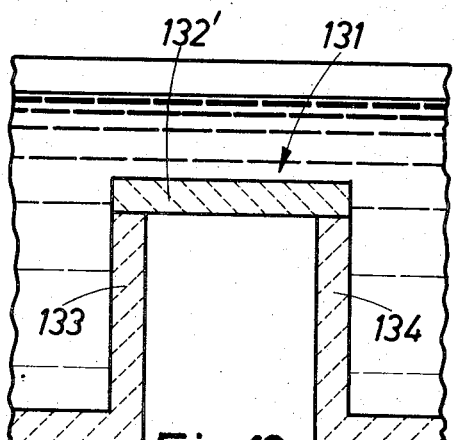

The top wall portion 132' of the threshold shown in FIG. 13 is constituted by an electrically conductive plate of tin oxide. The bottom face of this plate is in contact with a non-reducing atmosphere. The tin oxide plate is connected across an electric current source (not shown). The plate is traversed by electric current which is of uniform density over the whole area of the plate so that there is an entirely uniform heat distribution to the molten glass in conact with the top of the plate.

Figure 14:
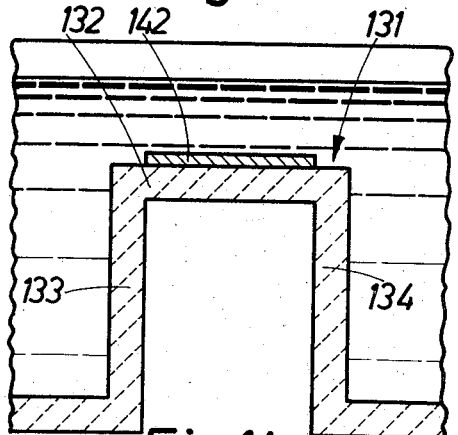

Referring to FIG. 14, the threshold here shown is formed of ordinary refractory material but the top wall portion 132 supports a molybdenum plate 142 having a width somewhat less than the width of the top wall portion 132 of the threshold, taking into account the good elecrical conductivity of molybdenum. The molybdenum plate is connected across a source of electric current (not shown). The current density within the plate is uniform over its entire area, which ensures a uniform heat distribution, this heat being concentrated in the column of molten glass of relatively restricted horizontal cross section located above the plate 142. It is not necessary to maintain a special atmosphere in contact with the bottom of the metal plate.

Figure 15:
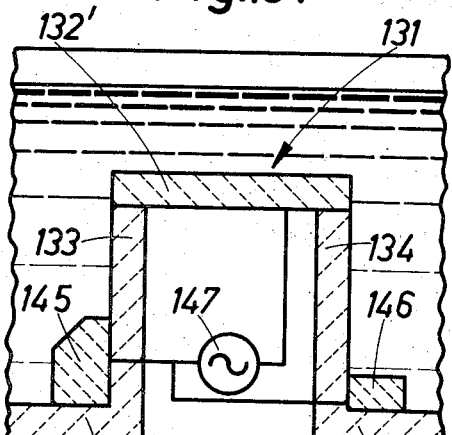

In FIG. 15 the top wall portion 132' of the threshold is formed by an electrically conductive p'ate of tin oxide. In the corner angles between the sole section 143 and the rear wall 133 of the threshold, on the one hand, and between the sole section 144 and the front wall 134 of the threshold, on the other hand, there are fillets 145 and 146 made of tin oxide and extending along the entire length of the threshold. The fillets 145 and 146 are connected to one pole of an alternating electric current source 147, plate 132' being connected to the other pole.

The cross-sectional forms of the fillets are selected in dependence on the required current density distribution within the molten glass, taking into account its rheological properties, in the vicinity of the threshold. In operation, electric current passes through the molten glass, between the electrodes 132 and 145 on the one hand and between electrodes 132 and 146 on the other hand, such electric currents creating a hot zone which envelops the threshold. The arrangement illustrated in FIG. 15 affords the advantage that it counters any tendency for the temperature of the molten glass along the walls 133 and 134 of the threshold to become too low or for the molten glass adjacent those walls to stagnate and to give rise to the formation of devitrified grains.

Figure 16:
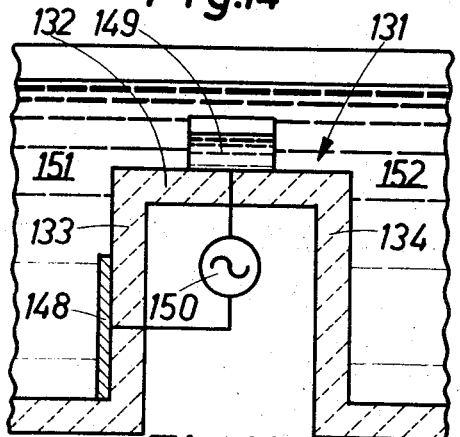

In the system shown in FIG. 16, there are two electrodes 148 and 149 disposed along the entire length of the threshold. The electrode 148, which is connected to one pole of an electric current source 150, is a plate of platinum disposed against the rear wall 133 of the threshold. The other electrode 149, which is connected to the other pole of the electric current source, is constituted by a molybdenum crucible containing a quantity of molten tin. This arrangement is suitable in cases in which there is naturally a very hot and strong upward current of glass along the front wall 134 of the threshold.

The passage of electric current between the electrodes 148 and 149 counters any tendency for such strong flow of molten glass at the front side of the threshold to induce the flow of impurities forming in the compartment 151 at the rear of the threshold into the compartment 152. The form of the electrode 148 can be selected to achieve a required predetermined electric current distribution along the rear side of the threshold. The quantity of molten tin in the electrode 149 can easily be removed from the crucible and replaced by another metal or by a suitable metal salt, without interrupting the operation of the machine.

Figure 17:
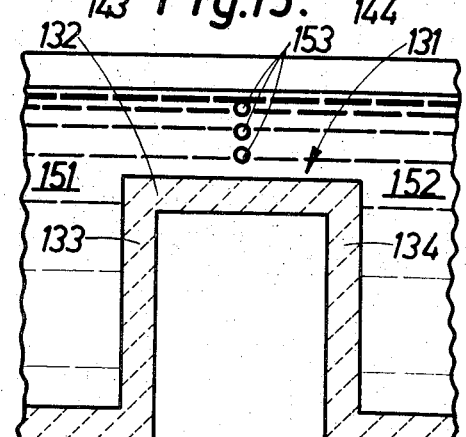

In the system shown in FIG. 17, heating is achieved by means of three electrical resistance heaters 153 located above the threshold. There is very little heat loss through the top wall of the threshold. The resistance heaters can be effective over the entire width of the kiln or over a part only of that width. The heat generated in the resistance heaters induces an upward flow of molten glass at the location of the threshold 131. The upward flow of glass continues to the surface region of the molten glass in the kiln and counters the tendency for molten glass currents to flow over the threshold from compartment 151 to compartment 152.

When using heating means for creating a thermal barrier extending transversely of the kiln, i.e., parallel with the plane containing the bottom portion of the drawn glass ribbon, it is not essential, whatever form of heating means be employed, for such heating means to extend over the full width of the kiln. For example, if such heating means extends only over a part of the kiln width which is co-extensive with the main part of the ribbon width, between its marginal zones, molten glass currents which flow back from the rear end wall of the kiln may flow laterally outwards around the ends of the thermal barrier and carry impurities into the marginal portions of the ribbon but the thermal barrier will protect the main central part of the ribbon from contamination by such impurities. As the marginal portions of the ribbon will be removed as waste in any event, such contamination is not a serious drawback, and this procedure thus represents a highly satisfactory way of continuously removing impurities from the molten glass mass.

Figure 18:
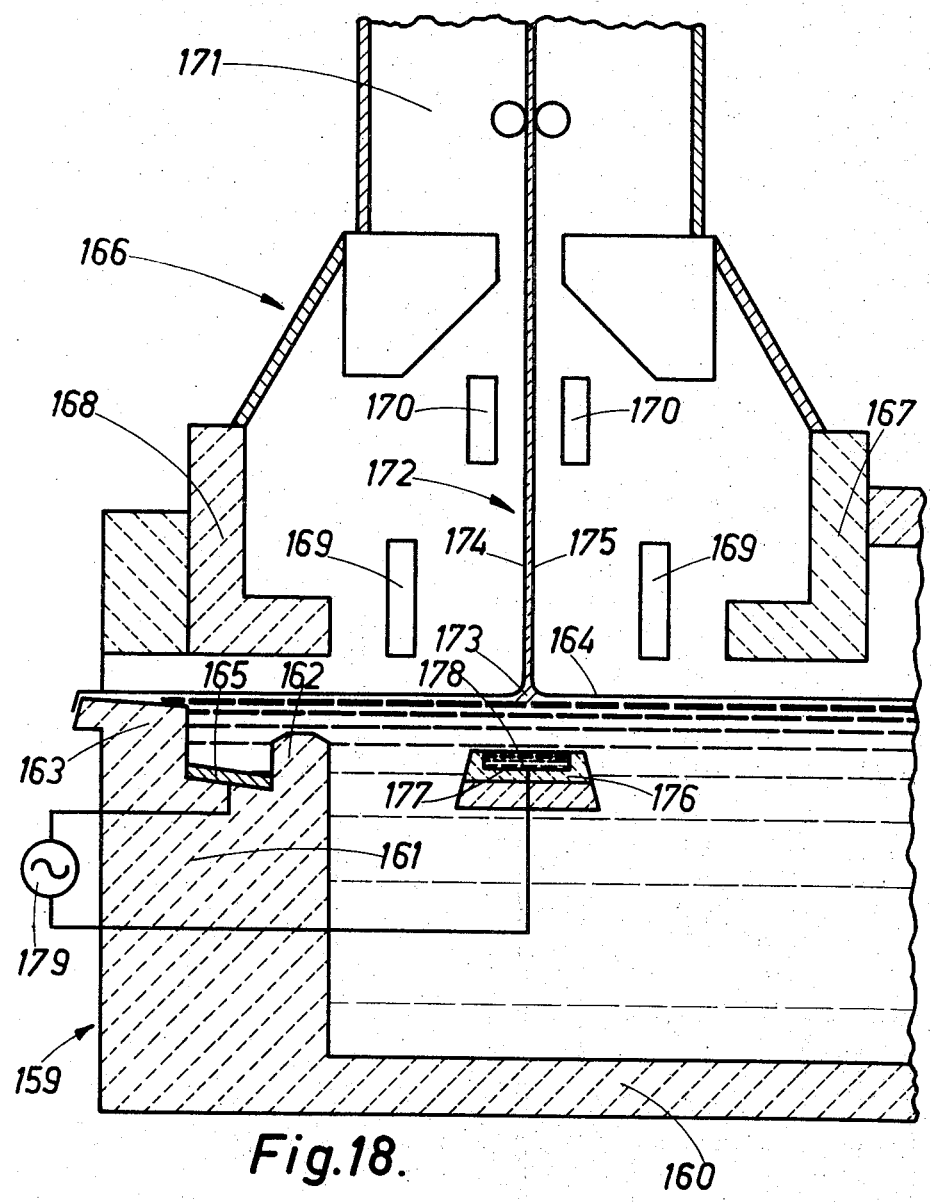
FIGS. 18 and 19 are elevational longitudinal cross sections of parts of Pittsburgh-type machines provided with further embodiments of the invention.

Reference is now made to FIG. 18 which shows part of a Pittsburgh-type machine composed of a deep kiln, or tank, 159 having a sole 160 and a rear end wall 161 which incorporates a threshold 162 and a top rear portion 163 located slightly below the level 164 of the molten glass in the kiln in order to permit a continuous overflow of molten glass at the rear of the kiln. In a trough between the threshold and the top rear portion 163 there is a tungsten plate 165 having a thickness of 1 cm., serving as an electrode.

Over the kiln, there is the usual drawing chamber 166 bounded at the front and rear by L-blocks 167 and 168, principal coolers 169 and auxiliary coolers 170 located within the drawing chamber on opposite sides of the path along which the glass ribbon is drawn, and the tower section 171 through which the glass ribbon 172 is drawn upwardly while undergoing cooling. The glass ribbon 172 is drawn from the surface of the molten glass in the kiln via a meniscus 173. The front face of the glass ribbon is marked 175 and its rear face is marked 174.

Instead of the traditional form of draw bar the machine incorporates a bar 176 having a recess 177 extending over nearly the entire length of the bar. A pool 178 of molten lead is held in this recess and serves as an electrode. The tungsten plate 165 and the pool 178 of molten lead are connected to opposite respective poles of an alternating electric current source 179.

The areas of the surfaces of the plate 165 and the pool 178 are important factors. They must be such that the electric current density is not at any point on those surfaces in excess of 0.5 amps/cm.$^2$ so that risk of bubble formation within the molten glass is minimal, but such that the current density is sufficient to cause the temperature of the glass over the threshold to be kept about 60° C. higher than it would be in the absence of the electric current.

The presence of the threshold 162 and the continuous generation of heat in the glass in the vicinity of this threshold causes the molten glass in contact with the threshold and above the plate 165 to be kept in stable rotary movement about a horizontal axis in a direction which is counterclockwise when viewed in the plane of FIG. 18. In consequence, impurities which may contaminate the molten glass in this region are kept away from the drawing zone. The surface flow of molten glass which feeds the rear face 174 of the glass ribbon 172 is kept substantially free of impurities which form in the region behind the threshold.

The glass which contributes to that surface flow into the rear face of the ribbon is heated in the hot zone in the vicinity of the threshold and the viscosity of that glass can be kept compatible to the viscosity of the glass in the forward flow of glass feeding the front face 175 of the glass ribbon.

The current of molten glass which flows in contact with the pool 178 of molten lead is perfectly steady. This is in contrast to the flow of molten glass in contact with the top of an ordinary slotted draw bar. In that case irregularities in the bar surface disturb the glass flow and often cause irregularities in the thickness of the drawn glass ribbon.

The extremities of the bar 176 are at a lower temperature than the pool 178 of molten lead and this lower temperature at the extremities of the bar assists in stabilizing the position of the ends of the meniscus 173 via which molten glass flows into the side margins of the ribbon.

The continuous overflow of molten glass across the top rear portion 163 of the rear end wall 161 of the kiln provokes a current of glass in the rearward direction which further helps to prevent impurities from passing from the region behind the threshold into the currents of molten glass feeding the ribbon. Such continuous rearward discharge of molten glass also serves to prevent the concentration of impurities in the region behind the threshold from building up to a high value.

The substantial thickness of the rear end wall 161 of the machine shown in FIG. 18 is of value in reducing heat loss from the glass in the kiln by conduction through that wall and consequently helps to keep the glass near the surface 164 at the required temperature for feeding the ribbon.

In the machine illustrated in FIG. 18, the density of the electric current between the electrodes must be sufficient to reheat the relatively cold currents of molten glass which flow upwardly between the draw bar 176 and the rear end wall 161 of the kiln.

Figure 19:
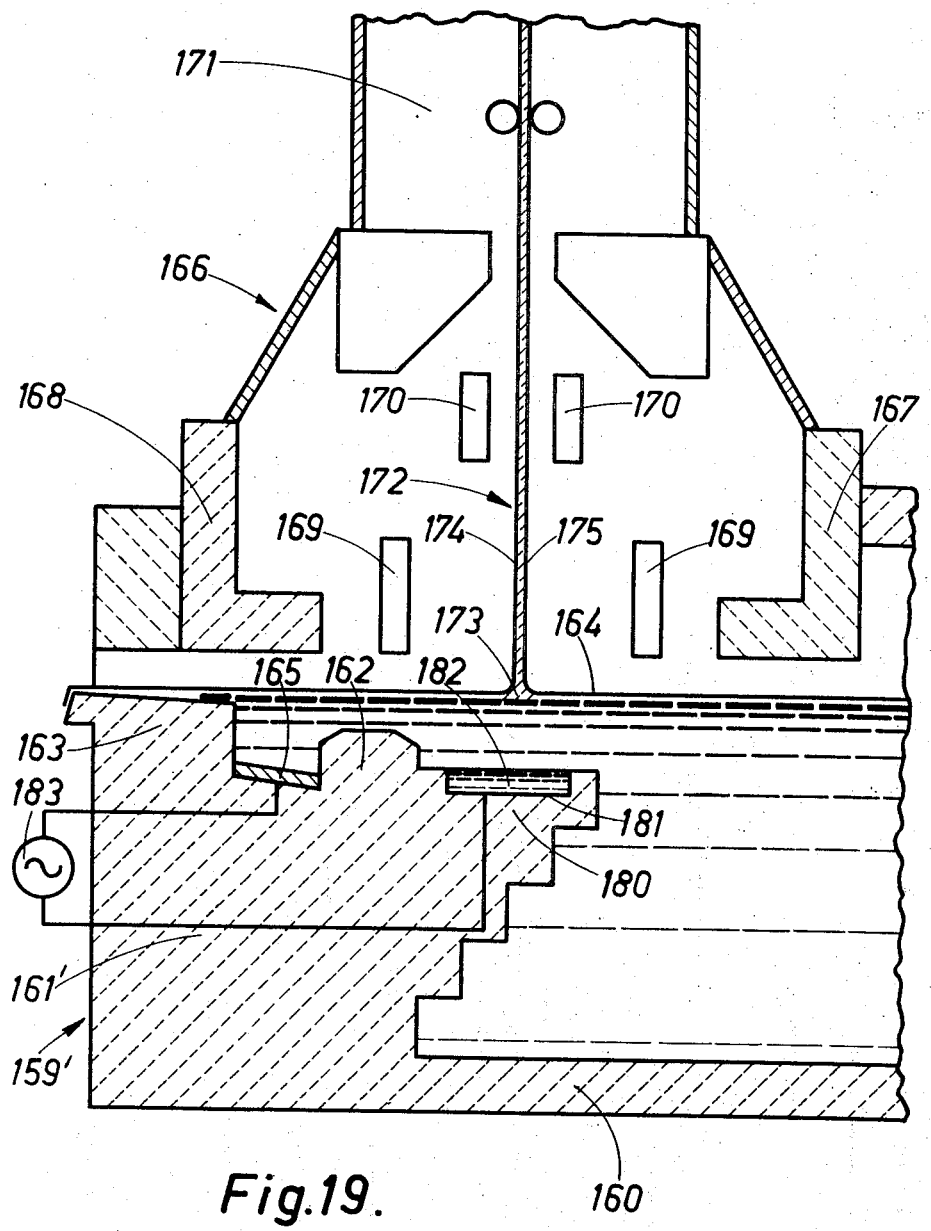

This factor affecting the choice of current density does not arise in the case of a machine of the type shown in FIG. 19. This figure shows a Pittsburgh-type machine which is similar to that shown in FIG. 18.

However, in the machine of FIG. 19 the rear end wall 161' of kiln 159' is of even greater thickness than wall 161 of FIG. 18, notably at a region located in an upper portion of its height but below the surface level 164 of the molten glass in the kiln.

The location, shape and cross-sectional dimensions of the rear end wall are such that an inwardly projecting ledge portion 180 thereof extends beneath the meniscus 173. This ledge portion 180 has a recess 181 in its top surface, the recess extending over nearly the entire internal width of the kiln. The recess holds a pool 182 of molten tin. Instead of molten tin, use could be made of a pool of some other molten metal or a pool of a suitable molten metal salt, e.g., a lithium salt. The top surface of the ledge portion 180 can be, for example, 20 centimeters beneath the surface 164 of the molten glass in the kiln.

The pool 182 of molten tin and the tungsten plate 165 are connected to opposite respective poles of a source 183 of alternating electric current.

The machine of FIG. 19 and its operation possess advantages similar to those of the machine of FIG. 18 and its operation insofar as those advantages derive from the substantial thickness of the rear end wall 161 of the kiln, the presence of the threshold 162, the passage of electric current between the electrodes to maintain a hot zone above the threshold, and the continuous overflow of molten glass over the top rear portion 163 of the rear end wall.

Unlike the embodiment of FIG. 18, there is in the operation of the machine of FIG. 19 no upward flow of glass between the electrode beneath the drawing zone and the rear end wall of the kiln. In the system of FIG. 18, there is an upward flow of glass between the bar 176 and the rear end wall and this upward current mixes with the forward flow of molten glass over the bar. In the FIG. 19 system there is no such mixing of currents feeding the meniscus. The operation of the apparatus illustrated in FIG. 19 can thus be regarded as one in which glass is drawn from a "monocurrent" (unitary current) and this is particularly favorable to the drawing of sheet glass of a very high standard of homogeneity.

In an actual embodiment having the form shown in FIG. 19, an electric current density of only 0.3 amps/cm.$^2$ at the plate 165 was found to suffice for permitting a drawing speed which in the FIG. 18 embodiment required a current density at that location of 0.5 amps/cm.$^3$, for the same resulting glass quality. Of course a current density higher than 0.3 amps/cm.$^2$, e.g. a current having a density of 0.5 amps/cm.$^2$, can be used in the operation of the embodiment of FIG. 19, in which case the drawing speed can easily be increased to 1.8 or even 2.0 times the maximum drawing speed which is possible in a conventional prior art Pittsburgh process.

In the operation of the embodiment of FIG. 19, the molten glass which goes to feed the rear face 174 of the glass ribbon 172 flows along the surface of the pool 182 of molten tin and is heated during its upward flow in the vicinity of the hot zone prevailing over the threshold 162. This flow of molten glass reaches the meniscus with but minimal contact with solid surfaces. These factors principally explain why so high a drawing speed is possible. Inasmuch as the flowability of the molten glass feeding the rear face of the ribbon is comparable to that of the glass flowing into its front face, there is very good stratification of the glass in the drawn ribbon.

Glass drawn in the apparatus of FIG. 18 or 19 has a rear face 174 which is notably flat. Because the extremities of the ledge portion 180, adjacent the side walls of the kiln, are somewhat cooler than the pool 182 of molten tin, they assist in stabilizing the position of the end portions of the meniscus 173 via which the molten glass feeds the margins of the ribbon.

Figure 20:
FIG. 20 is a reproduction of an anamorphosic photograph or "striascope," of a sample of sheet glass according to the invention.

FIG. 20 is a photographic reproduction of an anamorphosic photographic image of part of an edge face of a sample of sheet glass according to the invention, the edge face being exposed by cutting the sheet glass along a plane normal to the line of draw, the photographic image being called a "striascope." On the anamorphosic photograph, the width of the glass sheet is compressed and its thickness stretched.

In the photographic image, seams of glass of different refractive indices appear as bands of different optical densities and the way in which differently refractive seams of glass are distributed is revealed by contour lines which can be seen in the photographic image and which correspond to boundaries between juxtaposed seams. It will be noted that these lines are mainly substantially parallel.

The arrangement of the lines is such that they suggest a basic pattern of flat ellipses extending substantially from one edge to the other of the drawn sheet glass. This suggestion derives particularly from the presence of shallow outwardly convex curves extending in the lengthwise direction of the photographic image, and the presence of relatively smooth curves of much smaller radii joining the ends of opposed shallow curves. It is worth noting that in the case actually shown in FIG. 20, the above-mentioned flat ellipses, one within another, have a substantially common center, which is offset toward one of the faces of the sheet. The remaining seams located near the other face could be thought of as forming shallow outwardly convex curves possibly belonging to larger ellipses.

Figure 21:
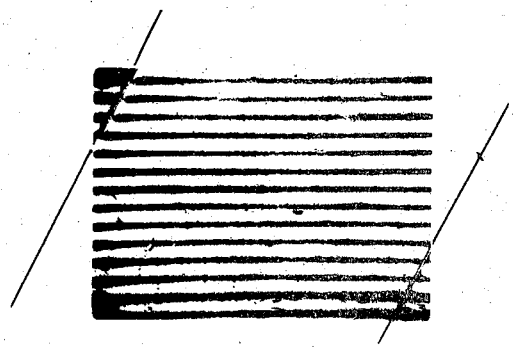
FIG. 21 is a photographic reproduction of the interference fringes formed by light rays projected through the sample of sheet glass represented by FIG. 20 during testing of such sample in an interferential microrefractometer according to the known method of Nomarski.

A sample of sheet glass such as the one represented by FIG. 20 was tested in an interferential microrefractometer in which light was projected from a slit source in such a way as to form a series of straight parallel interference fringes. The side edges of the sheet were cut to be parallel to one another and the sheet was placed in the light beam in such a way that the light beam entered one side edge face of the sheet and emerged from the opposite parallel side edge face of the sheet, the sheet being in a plane intersecting the interference fringes at 45°. The interference fringes of the emerging light appeared as shown in FIG. 21, i.e. without any apparent fault or break. The two oblique parallel lines intersecting the interference fringes represent the major faces of the glass sheet.

The glass ribbon exhibiting the properties as shown at FIGS. 20 and 21 can be obtained when using the improvement according to the invention, but in the present case, such figures and the corresponding glass ribbon were obtained when using the apparatus of FIG. 6.

Figure 22:
FIG. 22 is a reproduction of a "striascope," as above referred to, of a sample of sheet glass drawn by a classic prior art Pittsburgh-type drawing process.
Figure 23:
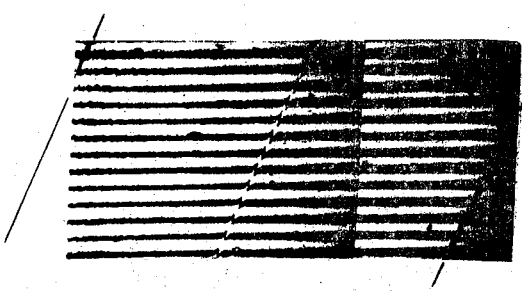

The distinctive characteristics of the sheet glass according to the invention which is the subject of FIGS. 20 and 21 become very apparent when those figures are compared with FIGS. 22 and 23. FIG. 22 is a reproduction of a triascope, produced under the same conditions as the image in FIG. 20, of part of an edge face of a sample of sheet glass drawn by a classic Pittsburgh-type process. FIG. 23 shows the effect of a sample such as drawn by a classic Pittsburgh-type process on the appearance of the interference fringes when the sample is tested in the same interferential microrefractometer used in testing the sheet represented by FIG. 21, and under the same conditions.

As appears from FIG. 22 the contour lines do not exhibit any kind of elliptical pattern. In some regions of the photograph, the lines converge to form sharp angles, in contradistinction with the smooth curves of FIG. 20. When placed in the light beam in the interferential microrefractometer the sheet glass caused a very marked fault or break to appear in the interference fringes, as shown in FIG. 23. This break is indicative of an abrupt change in the refractive index between adjacent seams of glass located midway between the major faces of the glass sheet.

Figure 24:
FIG. 24 is a photographic reproduction of a typical brush line pattern detected by photographic methods on a face of a sample of sheet glass drawn by a classic Libbey-Owens type process.

FIG. 24 shows a typical brush line pattern on a major face of a sheet of glass drawn by a classic Libbey-Owens drawing process. Those brush lines are detected by interferometry using the known Fizeau fringes. The sheet of glass to be tested is disposed on a polished sheet of glass in such a way that the two sheets form an extremely small angle with each other. The line of intersection of the two sheets must be perpendicular to the direction of draw of the sheet to be tested. The polished sheet of glass must have a planeity such that the thickness variation is in the range of λ/4. The faces of this polished sheet must be as truly parallel as possible.

When the two sheets so disposed are irradiated by rays which are substantially perpendicular to their faces, these rays upon reflection show a pattern of alternately white and black fringes, as can be seen in FIG. 24. Each black line is representative of a line of equal thickness of the sheet. These lines of equal thickness show small waves of small wavelength, which may be called "saw teeth." The presence of these "saw teeth" is indicative of the existence of "brushline" defect and allows it to be ascertained that this defect is in the nature of very small waves of the order of 0.3μ in thickness, with a width of from 0.1 to 1.0 mm.

When the two main faces of a sheet of glass according to the invention were subjected successively to examination for defects in precisely the same way as the sample of glass drawn by the Libbey-Owens process, no brush lines were detected on either face. The sample of sheet glass according to the invention and subjected to the examination was a sample sheet glass drawn by a process according to the invention in which there was a thermal barrier in the molten glass in the kiln at a location directly rearward of the drawing zone.

As an alternative, the brush lines can be detected by a method using reflection by projecting a beam of light onto the face of the glass sheet at an angle of incidence of the order of 65°, the axis of the beam being in a plane normal to such face and normal to the line of draw of the glass sheet, to cause light rays to be reflected from the face onto a light-diffusing screen placed about 1 m. from the glass sheet.

Figure 25:
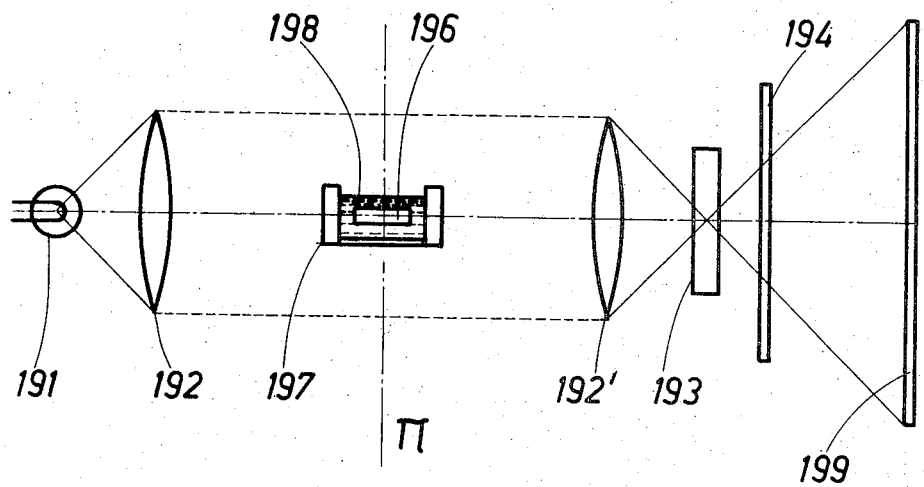
FIG. 25 is a schematic view of a striascopic apparatus for photographically recording the homogeneity of the glass within the cross section of a glass sheet.

The photographic images reproduced as FIGS. 20 and 22 were produced by means of striascopic apparatus as shown schematically in FIG. 25.

This apparatus includes an incandescent white light source 191, an achromatic condenser 192 located near to the light source, an objective 192', a Foucault system 193 and a mask plate 194 in which there is a vertically disposed rectangular slit. Each of the photographic images is the image of the light pattern transmitted in the striascope through a strip 196, 10–20 mm. in width, the width being in the direction of draw, separated from the appertaining drawn glass ribbon by cuts running across the full width of the ribbon normal to its line of draw. The strip was mounted with its width parallel to the light beam axis in a transparent tube 197 filled with a liquid 193 having a refractive index very close to that of the glass. A suitable liquid is ethylsalicylate or mononitrobenzene, but there are also numerous other suitable liquids.

The projected light rays passing through the slit in the mask plate 194 are recorded by a light-sensitive film 199. The striascope produces a photographic image presenting a 3–10 times magnification of the thickness of the sheet.

In order to produce a photographic record of the distribution of seams of glass of different refractive indices over the whole cross section of the sample strip 196, the strip is progressively displaced in its own plane and in a direction parallel with its own longitudinal axis, i.e. along a line normal to the plane of the drawing, so that the strip moves progressively through the path of the rays which impinge on the light-sensitive film and this film is simultaneously displaced in its own plane along a path normal to the plane of the drawing and in a direction opposite to the direction of displacement of the strip 196. In consequence, successive portions of the film are successively exposed through the above-mentioned slit. This slit has its longer dimension vertical and has a width of from 0.2 to 1 mm.

The linear speed of the film 199 can be, for example, 10 to 20 times slower than the linear speed of the strip 196 so that the photographic image of the whole strip is magnified in thickness but reduced in length. Thus the striascope produces an anamorphosic photographic record.

The displacement of the sample strip 196 and the light-sensitive film 199 can be mechanically synchronized. For example, the strip and the film can be displaced by a common motor through a reduction gearing which is variable to permit the relative speed to be pre-set within a given range.

In making a photographic record in a striascope as above-described it is suitable to use a "Copex Copy" film as marketed by Agfa-Gevaert of Mortsel, Belgium and to develop the film with an ordinary metolhydroquinone developer as commonly used for the development of photographic prints on light-sensitive paper.

Figure 26:
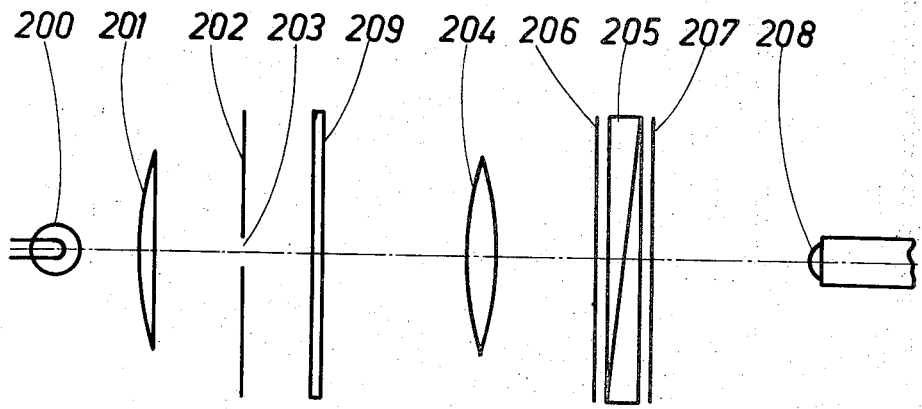
FIG. 26 is a schematic view of the optical system of an interferential microrefractometer for performing the "Nomarski" method.

Reference is now made to FIG. 26 which shows an interferential refractometer for performing the known method of Nomarski. The device includes light source 200 and, in line along the path of light from the source, a condenser lens 201, a mask 202 with a slit aperture 203, an objective 204, a birefringent double prism unit 205, generally called a "Wollaston" prism, with front and rear polarizing filters 206 and 207, and an optical focussing device 208 which may, for example, be an eye piece of an ordinary microscope or a device which focusses the transmitted rays onto a light-sensitive recording material. In an actual test a Nachet 300 microscope was used with a 3× objective and a 6× eye-piece, equipped with a photographic Polaroid chamber having a chamber index of 0.8. The film used was a black and white Polaroid roll film, 2½ x 3¼ inches, sensitivity 3000 ASA, type 37, the exposure time being 1 second.

In the absence of a sample to be tested, the parallel light beam from the slit aperture is divided by elements 205, 206, 207 into differently polarized and differentially retarded parts and the transmitted rays are focussed to form an interference pattern composed of a series of straight parallel bands, as represented in FIG. 21. Further details about the construction and operation of an interferential microrefractometer of this type can be found in the previously cited paper entitled "Objectif interférentiel à prisme de Wollaston" published by Techniques de l'Ingénieur, of 21, rue Cassette, Paris VI, France.

In order to use the refractometer for testing a sample 209 of sheet glass, the edge faces of the sample are polished and it is placed in the parallel light beam from the slit aperture so that the beam traverses the sheet from one side edge face to the opposite side edge face and so that the sheet is in a plane intersecting the parallel interference bands. Care must be taken, for better results, that the thickness of the glass transversed by the light rays is very small, preferably of the order of 1 mm. Thus, the sample is located at FIG. 26, the same way as it is at FIG. 27, except that for the latter, the two side edge faces are distant of only about 1 mm., that the length of the sample viewed perpendicularly to the plane of the drawing is reduced to one or a few centimeters and that the sample is rotated (in this plane perpendicular to the sheet of the drawing) as said hereabove, so that lines parallel to the faces of the drawn ribbon form an angle, preferably of 45°, with the interference bands.

When a sample of sheet glass according to the invention is thus placed in the light beam, the continuity of the interference bands is not affected, whereas a sample of sheet glass drawn by a classic Pittsburgh-type drawing process causes a marked break in the bands as shown in FIG. 23.

It will be understood that the above description of the present invention is susceptible to various modifications, changes and adaptations, and the same are intended to be comprehended within the meaning and range of equivalents of the appended claims.

I claim:

1. In a process of manufacturing sheet glass by continuously feeding molten glass into a kiln to establish a continuous forward flow of glass to a drawing zone, and continuously drawing molten glass in the form of a ribbon upwardly from the surface of the molten glass in the drawing zone, the improvement consisting in that, in at least one place which in plan aspect of the kiln is spaced inwardly from a boundary of the surface of the molten glass in the kiln, the molten glass in the kiln is heated to maintain at that place a thermal barrier formed by an upward flow of molten glass which rises to said surface from a position in the vicinity of a wall portion underlying such upward flow of or in the kiln so that molten glass behind the thermal barrier is substantially prevented by such wall portion from flowing beneath said thermal barrier.

2. A process as defined in claim 1 wherein molten glass at the surface of such forward flow directly feeds the bottom of the ribbon at its front face whereas molten glass at a lower level of such forward flow rises at a location behind the drawing zone and forms an oppositely directed surface flow which feeds the ribbon at its rear face, and said step of locally heating is carried out to establish such thermal barrier at a location which coincides with the location where molten glass rises behind the drawing zone.

3. A process as defined in claim 2 wherein said step of locally heating is carried out for creating a thermal barrier which extends at least over a portion of the kiln width which is coextensive with the width of the ribbon.

4. A process as defined in claim 1 wherein said step of locally heating is carried out for creating a thermal barrier situated adjacent a side boundary of the surface of the molten glass in the kiln and at a location from which there is surface flow of molten glass towards an edge of the ribbon.

5. A process as defined in claim 1 wherein said step of locally heating is carried out for creating a thermal barrier which is confined to an upper portion of the depth of the kiln.

6. A process as defined in claim 1 wherein said step of locally heating is carried out for creating a thermal barrier which extends over the full depth of the kiln.

7. A process as defined in claim 1 wherein a threshold is completely immersed in the molten glass and the thermal barrier is maintained above the threshold.

8. A process as defined in claim 7 wherein the thermal barrier is constituted by an upward flow of molten glass which rises against the threshold and continues its upward movement above the level of the top of such threshold.

9. A process as defined in claim 7 wherein the threshold is hollow and, for maintaining the upward flow of molten glass thereat, said step of locally heating is carried out by generating heat in the space enclosed by the threshold.

10. A process as defined in claim 7 wherein the threshold is constituted by a single solid wall and, for maintaining the upward flow of molten glass thereat, said step of locally heating is carried out by heating the bottom of such wall.

11. A process as defined in claim 7 wherein, for maintaining the upward flow of molten glass, said step of locally heating is carried out by heating means associated with a wall of the threshold.

12. A process as defined in claim 7 wherein, for maintaining the upward flow of molten glass, said step of locally heating is carried out by heating means in contact with the molten glass adjacent the threshold.

13. A process as defined in claim 12 wherein, for maintaining the upward flow of molten glass, said step of locally heating is carried out by heating means which is disposed on a face of the threshold.

14. A process as defined in claim 7 wherein, for maintaining the upward flow of molten glass above the threshold, said step of locally heating is carried out by heating means located within the body of molten glass and spaced from the threshold.

15. A process as defined in claim 7 wherein the threshold is upwardly extended by a plate.

16. A process as defined in claim 1 wherein said step of locally heating is carried out by generating heat within the kiln at that place.

17. A process as defined in claim 1 wherein said step of locally heating is carried out by passing an electric current through the molten glass between electrodes within the glass.

18. A process as defined in claim 17 wherein at least one such electrode is formed by a pool of a molten electrically conductive metal-containing material.

19. A process as defined in claim 17 wherein at least one such electrode is disposed above a threshold completely immersed in the molten glass.

20. A process as defined in claim 17 wherein said step of locally heating is carried out by maintaining heating current between electrodes disposed on opposite sides of a threshold completely immersed in the molten glass.

21. A process as defined in claim 17 wherein at least one electrode is disposed beneath the location at which the ribbon is drawn from the surface of the molten glass in the kiln.

22. A process as defined in claim 21 wherein an element is disposed beneath the location at which the glass ribbon is drawn from the surface of the molten glass in the kiln, and an electrode in the form of a quantity of molten electrically conductive metal-containing material is held in the element.

23. A process as defined in claim 1 further comprising withdrawing glass from the surface of the molten glass in the kiln at a location behind the thermal barrier for inducing an outward surface current of glass through the barrier.

24. In apparatus for drawing sheet glass, including a kiln having a wall portion and a feed end at which the kiln can be continuously fed with molten glass, and means for continuously drawing a ribbon of glass upwardly from the surface of the glass at a drawing zone in the kiln, the improvement comprising means operatively associated with said kiln for locally heating the molten glass in said kiln at a location spaced horizontally inwardly from a boundary of the molten glass surface for maintaining at that location a thermal barrier formed by an upward flow of molten glass which rises to the surface from a position in the vicinity of a wall portion of or in the kiln, which wall portion underlies such upward flow whereby said wall portion serves to prevent molten glass behind said thermal barrier from flowing beneath it.

25. An arrangement as defined in claim 24, wherein the drawing zone is spaced from that boundary of the surface of the molten glass in said kiln which is opposite the feed end of said kiln, and said local heating means is provided for maintaining the upward flow of glass at a location which in plan aspect of the kiln is between the drawing zone and such opposite boundary reached by the surface of the molten glass in the kiln when said apparatus is in use.

26. An arrangement as defined in claim 25 wherein said local heating means is provided for maintaining the upward flow of glass between the drawing zone and such opposite glass surface boundary, and for causing the upward flow to occur over at least a portion of the kiln width which is coextensive with the width of the ribbon being drawn.

27. An arrangement as defined in claim 24 wherein said local heating means is provided for maintaining such upward flow of molten glass at a location which in plan aspect of the kiln is adjacent a side boundary to which the surface of the molten glass in said kiln extends when said apparatus is in use.

28. An arrangement as defined in claim 24 wherein said local heating means is arranged so that it is effective for maintaining an upward flow of molten glass over the full depth of said kiln.

29. An arrangement as defined in claim 24 wherein said local heating means is arranged so that it is effective for maintaining an upward flow of molten glass in an upper portion of the depth of the kiln.

30. An arrangement as defined in claim 24 further comprising a threshold located so as to be completely immersed in the molten glass in said kiln when said apparatus is in use and so that said local heating means maintains the upward flow of molten glass above said threshold.

31. An arrangement as defined in claim 30 wherein said local heating means are arranged for maintaining such upward flow of molten glass from a position against a side face of said threshold.

32. An arrangement as defined in claim 30 wherein said threshold is hollow and said local heating means are disposed within the region enclosed by said threshold.

33. An arrangement as defined in claim 30 wherein said threshold is formed by a single solid wall and said local heating means are arranged for heating the bottom of said wall to create the upward flow of molten glass above said threshold.

34. An arrangement as defined in claim 30 wherein said threshold includes a wall which incorporates said local heating means.

35. An arrangement as defined in claim 30 wherein said threshold has a surface on which said local heating means is disposed to be in contact with the molten glass in said kiln when said apparatus is in use.

36. An arrangement as defined in claim 30 wherein said local heating means is disposed adjacent said threshold and in a position so as to be in contact with the molten glass in said kiln when said apparatus is in use.

37. An arrangement as defined in claim 24 wherein said local heating means is disposed for generating heat directly within the kiln.

38. An arrangement as defined in claim 24 wherein said local heating means comprises electrodes in the molten glass and between which electric current can be passed through the molten glass in said kiln for heating the glass to maintain the upward flow of molten glass.

39. An arrangement as defined in claim 38 wherein at least one of said electrodes is formed by a pool of a molten electrically conductive metal-containing material.

40. An arrangement as defined in claim 38 further comprising a threshold located so as to be completely immersed in the molten glass in said kiln when said apparatus is in use and wherein at least one of said electrodes is disposed above said threshold.

41. An arrangement as defined in claim 38 further comprising a threshold located so as to be completely immersed in the molten glass in said kiln when said apparatus is in use and wherein there are electrodes disposed on opposite sides of a threshold.

42. An arrangement as defined in claim 38 wherein one of said electrodes is disposed beneath the location at which the ribbon is drawn from the surface of the molten glass in said kiln when said apparatus is in use.

43. An arrangement as defined in claim 42 further comprising, beneath the drawing location, a draw bar which supports one of said electrodes.

44. An arrangement as defined in claim 42 further comprising an element forming a unit with the rear end wall of said kiln and wherein said one of said electrodes is supported by said element.

45. An arrangement as defined in claim 38 wherein at least one of said electrodes is made of a solid material selected from the group consisting of metal and an electrically conductive refractory material.

46. An arrangement as defined in claim 45 wherein said at least one of said electrodes is made of a refractory precious metal, molybdenum, tungsten or $SnO_2$.

47. An arrangement as defined in claim 38 wherein at least one of said electrodes is composed of a molten electrically conductive metal-containing material.

48. An arrangement as defined in claim 47 wherein said material is tin or lead.

49. An arrangement as defined in claim 47 further comprising means defining a reservoir holding said electrode in contact with molten glass in said kiln, said reservoir having an extension located at a region at a lower temperature than the molten glass in said kiln, material in said extension and in electrically conductive contact with said electrode, and a cable connected to said material in said extension for connection to a voltage source.

50. An arrangement as defined in claim 24 further comprising a threshold located so as to be completely immersed in the molten glass in said kiln when said apparatus is in use and located between bottom portions of said kiln which are at different levels.

51. An arrangement as defined in claim 24 wherein said kiln is provided with at least one skim opening for the withdrawal of molten glass from the surface of molten glass in said kiln, said skim opening being located behind a location where the upward flow of molten glass is maintained when said apparatus is in use.

52. A drawn glass sheet manufactured by the method defined in claim 1 and constituted by a series of seams of glass of different refractive indices distributed across the sheet so that in a plane normal to the line of draw of the sheet, and across the full width of the drawn sheet, the seams appear as a pattern of principally substantially parallel contour lines forming a pattern of flat ellipses one within another, and the refractive indices of the seams being such that the change of refractive index from one seam to the next produces no marked break in the continuity of parallel interference fringes when the sheet is examined by means of an interferential microrefractometer using a light beam which is projected through the sheet glass parallel with its main faces.

References Cited
UNITED STATES PATENTS

| | | | |
|---|---|---|---|
| 3,463,625 | 8/1969 | Olink | 65—203 X |
| 3,692,510 | 9/1972 | Goldberg et al. | 65—203 |
| 1,598,764 | 9/1926 | Fox et al. | 65—203 |
| 1,489,875 | 4/1924 | Whittemore | 65—90 X |
| 1,609,999 | 12/1926 | Ferngren | 65—165 X |

ARTHUR D. KELLOGG, Primary Examiner

U.S. Cl. X.R.

65—90, 136, 203